United States Patent [19]

Fujiwara

[11] Patent Number: 5,057,219
[45] Date of Patent: Oct. 15, 1991

[54] SCUM TREATING APPARATUS

[76] Inventor: Michihiro Fujiwara, 2-13-37-1006, Mikunihonmachi, Yodogawa-ku, Osaka, Japan

[21] Appl. No.: 518,531

[22] Filed: May 2, 1990

[51] Int. Cl.$^5$ ............................................. B01D 21/00
[52] U.S. Cl. .................................... 210/525; 210/541; 210/542
[58] Field of Search ......................... 210/525, 541, 542

[56] References Cited

U.S. PATENT DOCUMENTS 4,462,909 7/1984 Kennel .................................. 210/525

Primary Examiner—Frank Sever
Attorney, Agent, or Firm—Koda and Androlia

[57] ABSTRACT

The present invention is a scum-treating apparatus installed in the disposal pond for removing the scum floating on the surface of the water with the movement of the flights in the disposal pond as the motive power to purify the water. The trough is fixed and the damming-up device is provided in front of the trough to move up and down the damming-up device by being interlocked with the flights. In particular, the interlocking is provided by a plurality of projecting portions and dented portions between the projecting portions at a pointed end thereof, so that the large scum are flowed into the trough when the flights correspond to the respective projecting portions while the float is slightly risen up under the surface of the water when the flights correspond to the dented portions to collect the far scum toward the trough. Thus, both the large scums and the small scums can be effectively introduced into the trough.

2 Claims, 25 Drawing Sheets

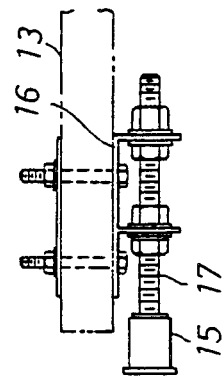
Fig. 5
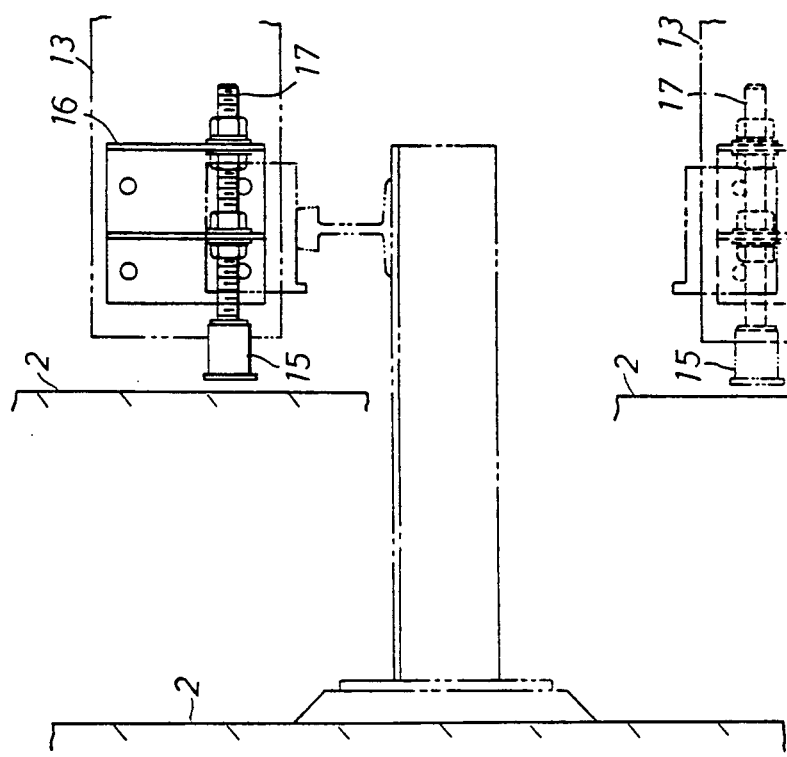
Fig. 4
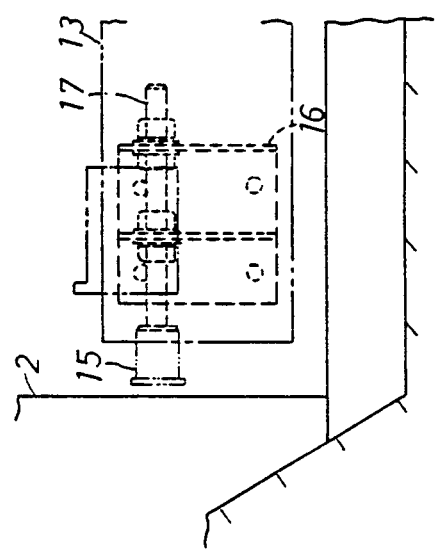

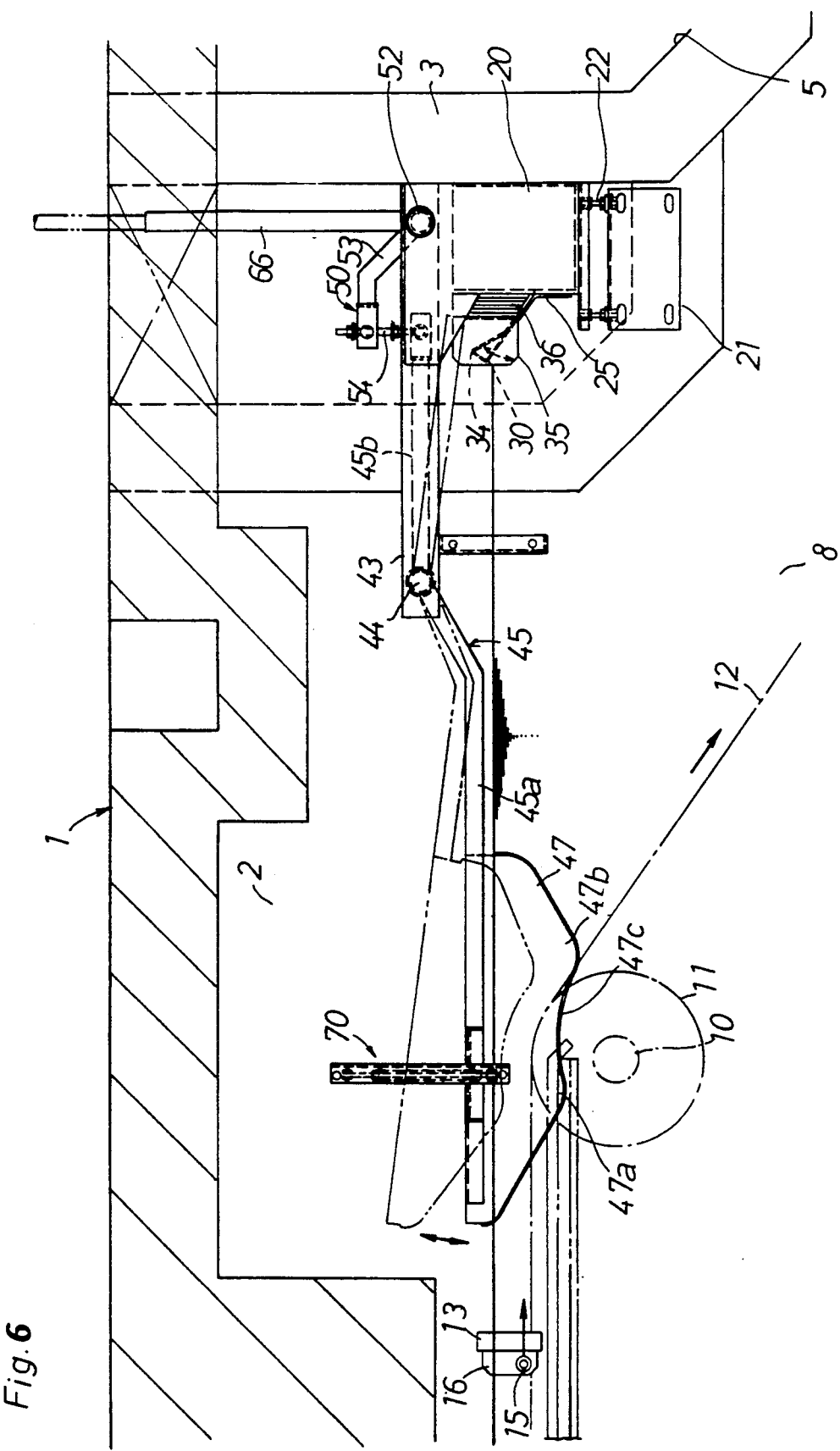

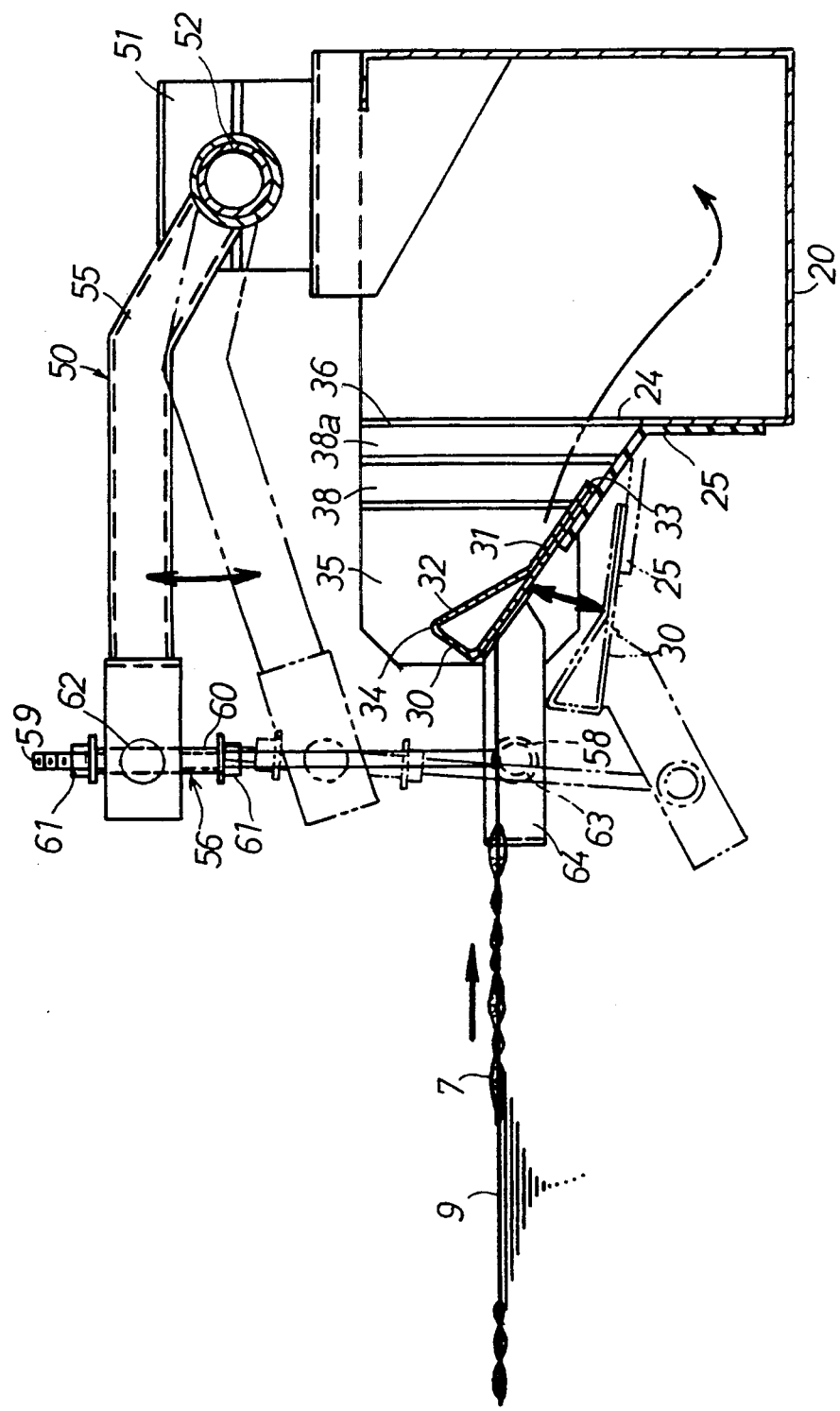

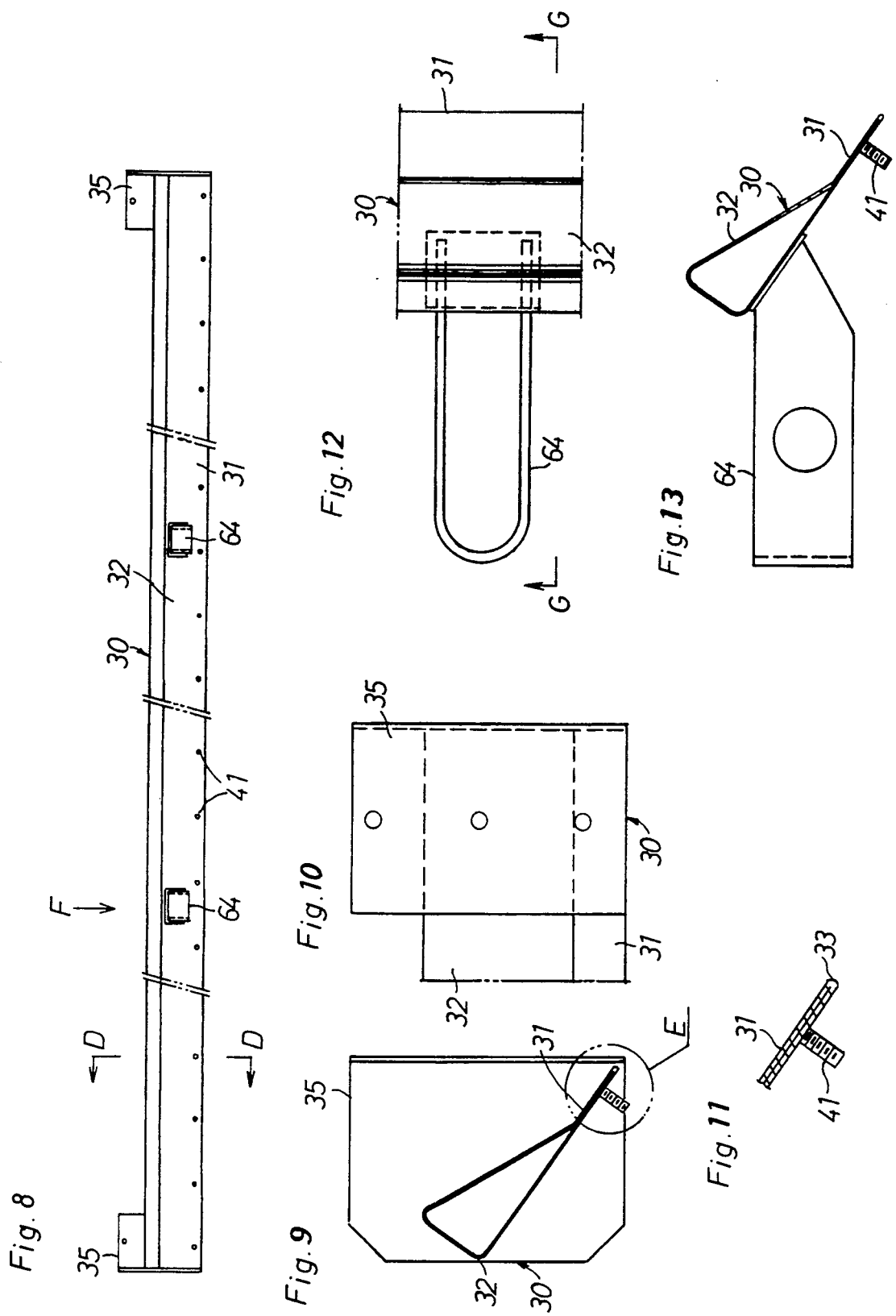

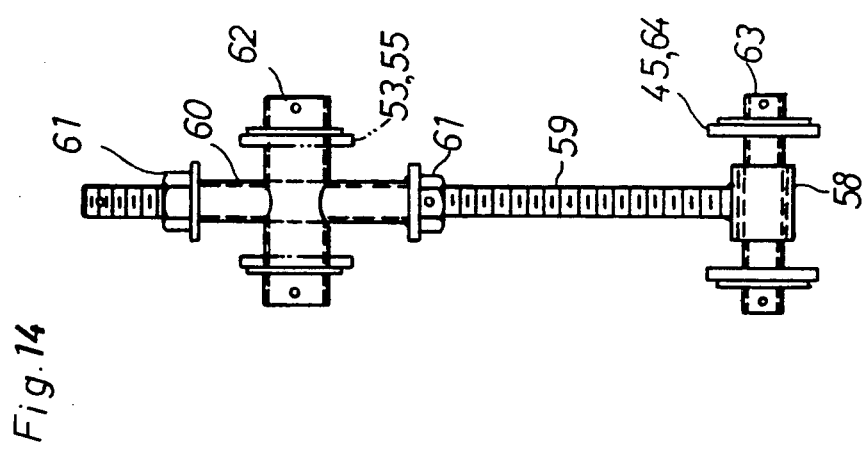

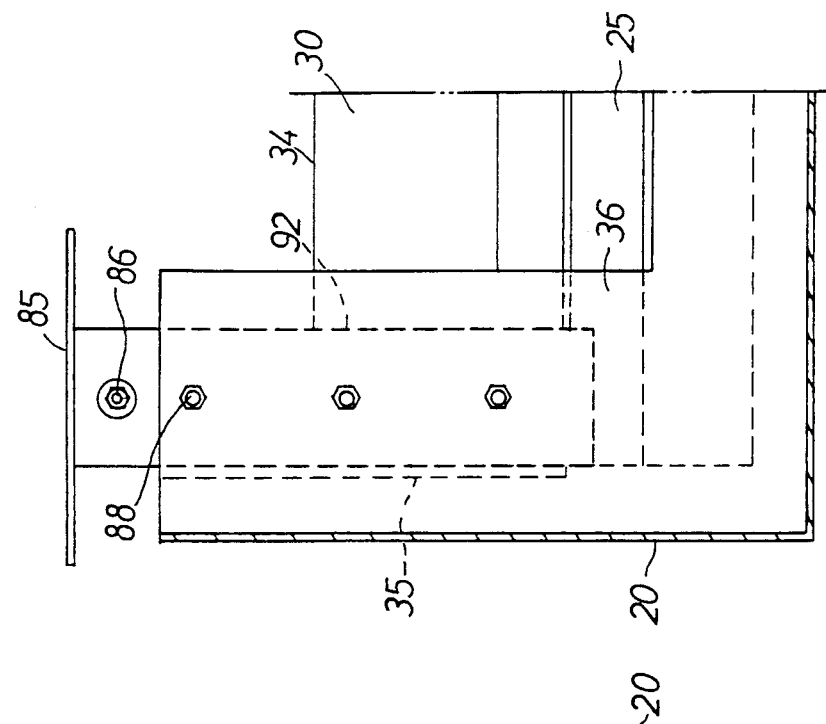
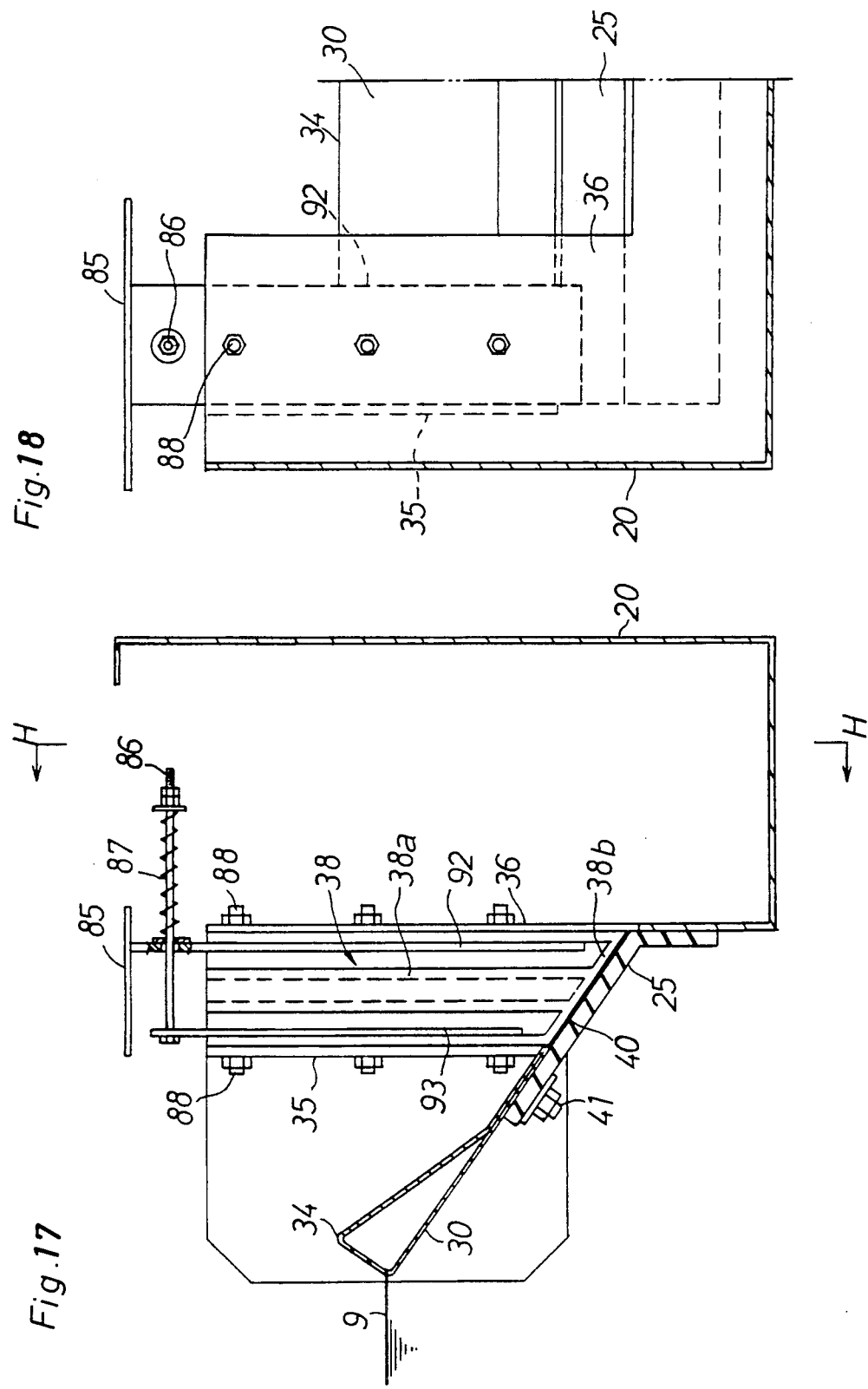
Fig.18
Fig.17

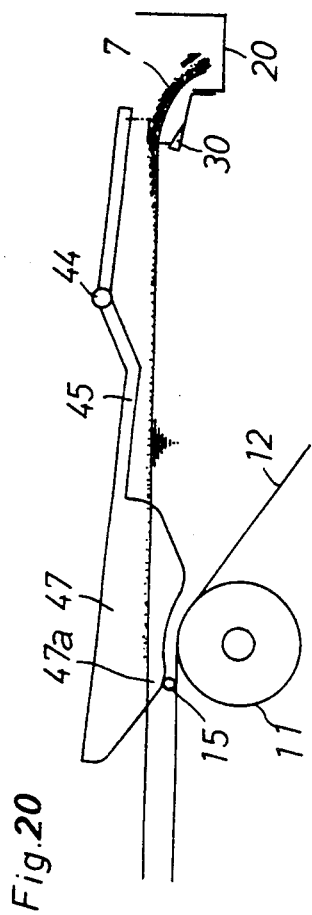
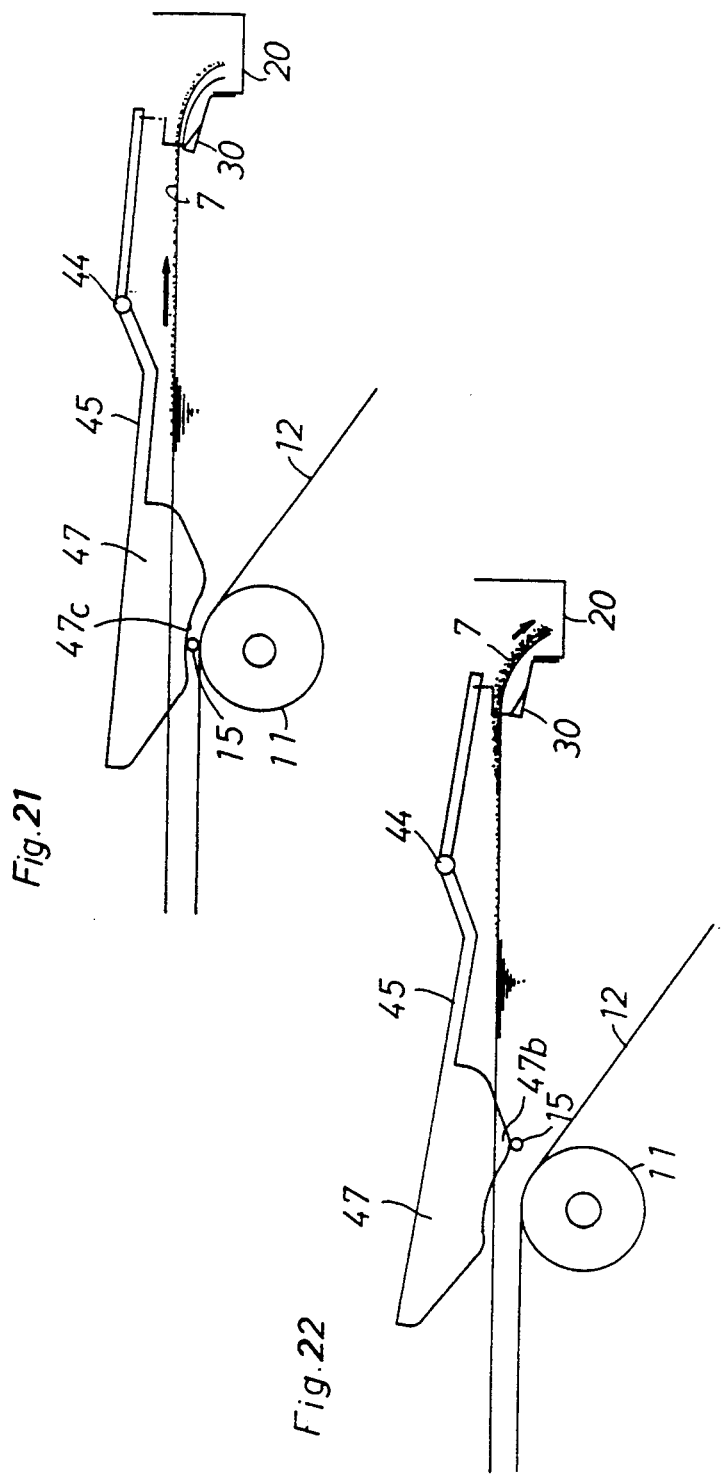
Fig. 20
Fig. 21
Fig. 22

Fig. 26
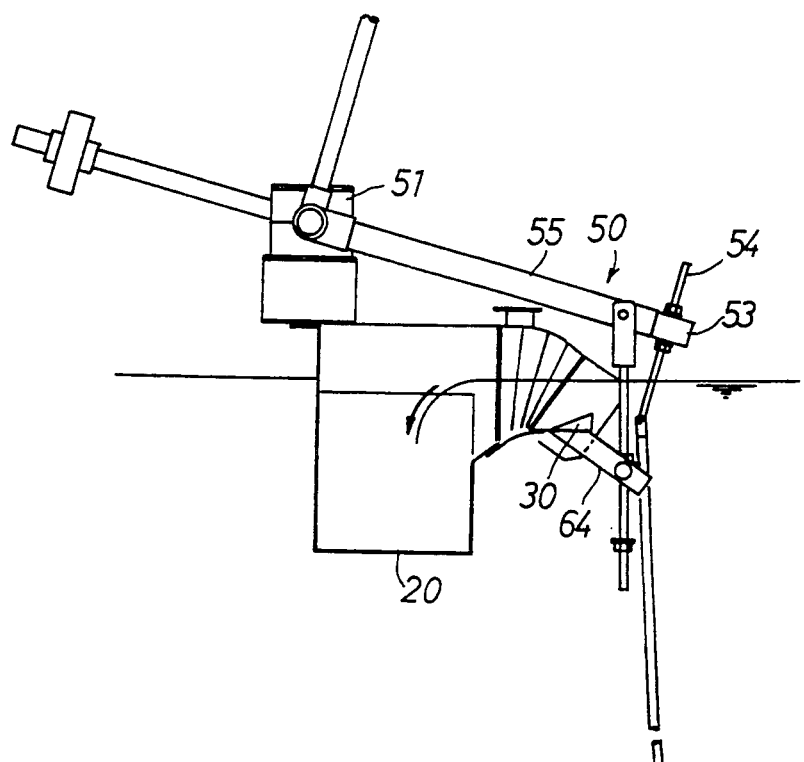
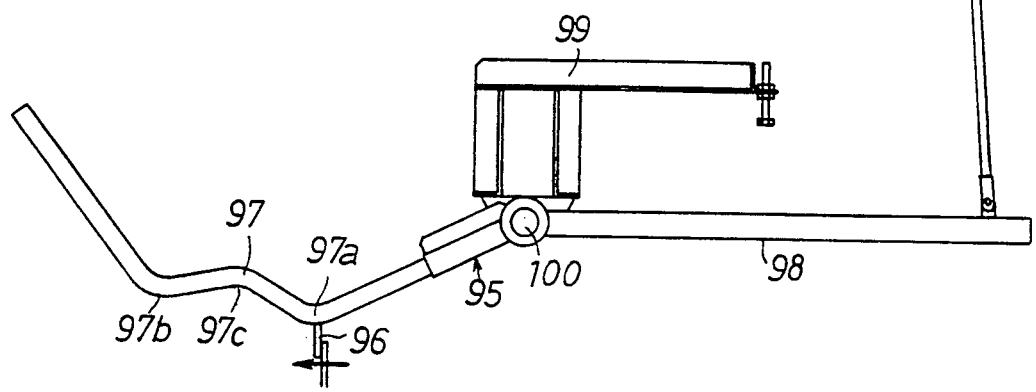

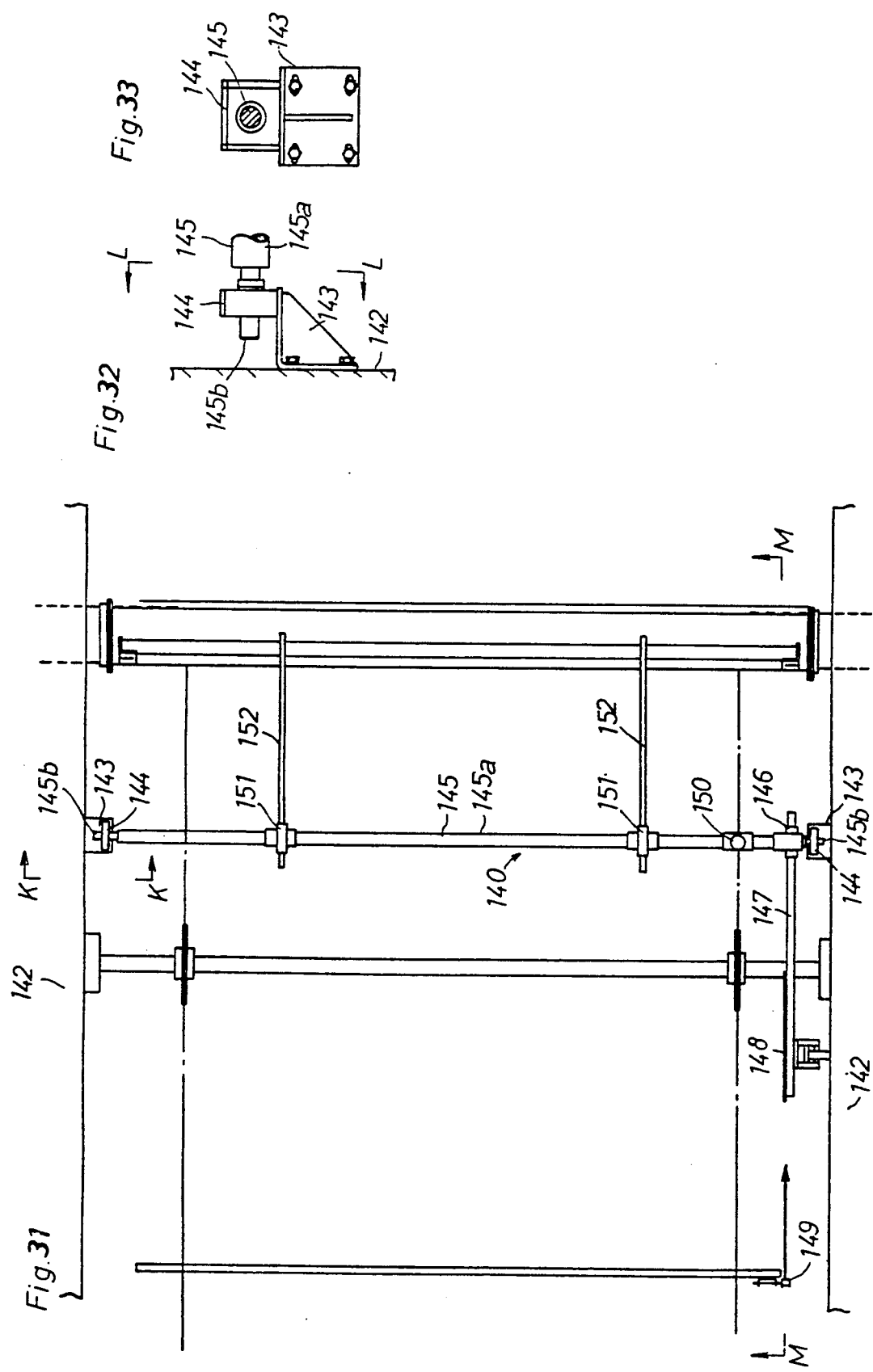

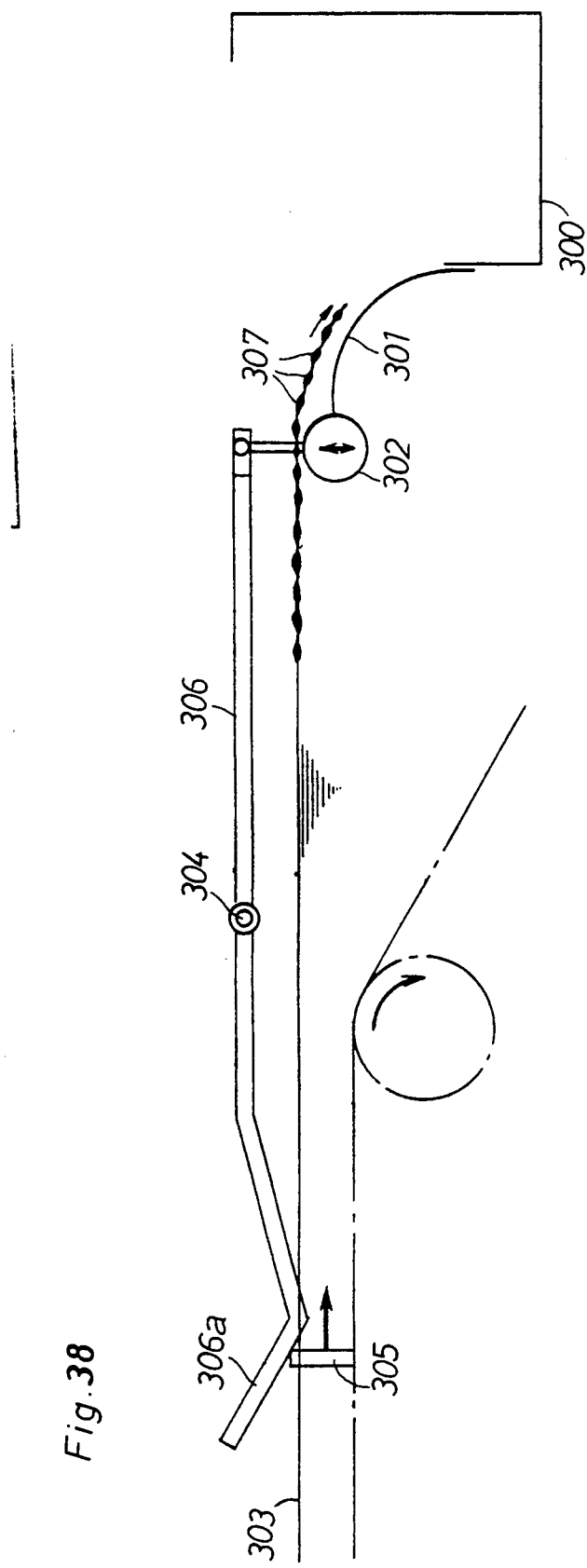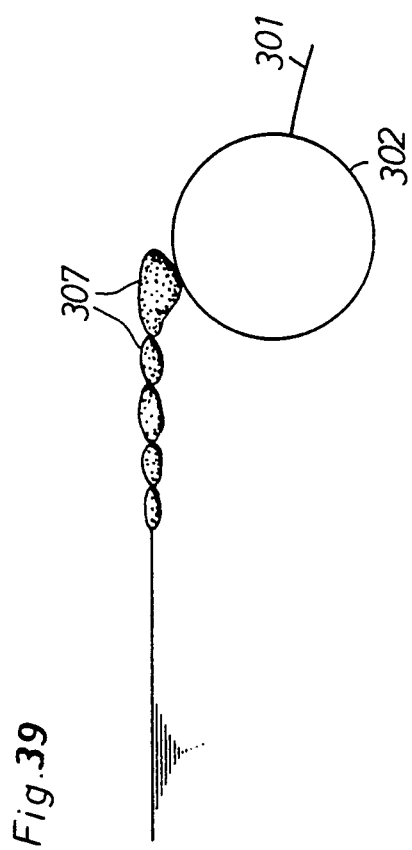
Fig.38
Fig.39

SCUM TREATING APPARATUS

BACKGROUND OF THE INVENTION

This invention relates to a scum treating apparatus for removing a large quantity of scum drifting on the water surface in the starting or final sedimentation pond therefrom.

The applicant of this invention has developed and proposed a scum removing apparatus in connection with the movement of flights on the pond. The Utility Model Registration Application, No. 094729 (Application Date: June 22, 1965) discloses the abovesaid proposal.

An outline of this apparatus is as shown in FIG. 38. Support means 301 formed of a rubber sheet is disposed in front of a trough or scum receiving means 300 and a float or damming up means 302 is provided ahead of support means 301 so as to be raised above or lowered below the water surface 303. For raising or lowering the float, a horizontal lever shaft 304, which is one of the interlocking means, is provided on the water surface 303 of the pond and a lever-like arm 306, which is another one of the interlocking means and has a projecting part opposing the flight 305 and an extending part directed toward the float 302, is supported around the lever shaft 304 at the midpoint thereof. The lever-like arm 306 is provided with a cam part 306a which is still another one of the interlocking means and is so constructed as to be kicked up by the flight 305 coming closer thereto and, thereby, rotates to depress the float 302. When the flight 305 passes the cam part 306a, the lever-like arm 306 rotates in the initial direction and thus the float 302 rises above the water surface. With the repeat of such rising and lowering movement, the scum masses 307 are introduced into the trough 300 and removed outside (the other treating apparatus) through a path not shown.

The scam treating apparatus as above, however, suffers the following problems.

The cam 306a comprises one projecting portion so as to be liftedly moved one time by one time of the passage of the flight 305.

The sprockets driving the chain are arranged at two points in the vicinity of the surface 303 of the water and two points in the bottom portion of the basin, that is four points in all, and the flight 305 passing between two sprockets on the upper side is operated so as to collect the scum 307 on the surface 303 of the water toward the trough 300, as is shown in FIG. 38. However, subsequently, the flight 305 makes progress in a oblique-downward direction to the lower sprocket to be submerged under the surface of the water according to the conditions of the disposal pond, so that the scum 307 cannot be sufficiently positively collected toward the trough 300.

Furthermore, in this type of settling basin, the cam 306a operates one time in the above described manner so that, although the scum 307 close to the front of the float 302 can be introduced into the trough 300, the scum 307 far from the float cannot be skillfully and efficiently guided to the trough 300 since the flow speed is reduced.

As a result, effective introduction of the scum masses 307 into the trough 300 is hardly possible. With a degree of depressing the float 302 set small, the flowing speed is raised and the scum masses 307 distant from the float can be introduced to the vicinity of the float 302. However, on the contrary, the large scum masses 307 touching the float 302 and staying thereat are prevented from being introduced into the trough 300 and, therefore, a quantity of the scum masses to be collected decreases to a large extent.

Further, the cam 306a, if formed into one body with the lever-like arm 306, the whole of the arm 306 must be replaced when the cam 306a has greatly worn, thereby requiring much labor for maintenance and high cost for replacement. When leaving wear of the cam 306a as it is, the degree of depressing the float 302 is reduced and effective introduction of the scum masses 307 . . . into the trough 300 becomes impossible.

In addition, as other problems, it has been found from experiment that, since the float 302 is circular in cross section and hollow, the large scum masses 307 flowing downstream ride on and stay at the upper curved surface of the float 302 as shown in FIG. 39, when subsequent masses 307, too, are prevented from flowing further.

SUMMARY OF THE INVENTION

This invention has been initiated for solving the above-described problems. A principal object of this invention is to enable effective introduction of both large and small scum masses into the trough.

Another subordinate object is to fabricate an apparatus exhibiting excellent fuction in introducing scum masses into the trough as above to be simple in structure, low in cost, and exceedingly easy to handle for maintenance.

BRIEF DESCRIPTION OF THE DRAWINGS

FIGS. 1 through 22 show a first embodiment of this invention.

FIG. 1 is a plan view of the embodiment;

FIG. 2 is a vertical sectional view thereof;

FIG. 3 is a sectional view thereof taken along the line A—A in FIG. 1;

FIG. 4 is a sectional view of the structure of a flight and roller in the pond;

FIG. 5 is a plan view of the flight and roller shown in FIG. 4;

FIG. 6 is a sectional view taken along the line B—B in FIG. 1;

FIG. 7 is a sectional view taken along the line C—C in FIG. 1;

FIG. 8 is a front view of only a float;

FIG. 9 is a sectional view taken along the line D—D in FIG. 8;

FIG. 10 is a back view thereof shown in FIG. 9;

FIG. 11 is an enlarged sectional view of the part E of the float shown in FIG. 9;

FIG. 12 is a sectional view taken along the arrow mark from the direction F in FIG. 8;

FIG. 13 is a sectional view taken along the line G—G in FIG. 12;

FIG. 14 is a front view of an example of the concrete structure of a rod;

FIG. 15 is a perspective view of a float and a trough, which shows the dammed flow of scum;

FIG. 16 is a perspective view showing a state in which the scum flows into the trough;

FIG. 17 is a sectional view showing the float, trough, side seal, and others;

FIG. 18 is a sectional view taken along the line H—H in FIG. 17;

FIG. 19 is a perspective view showing an example of the concrete structure of guide means;

FIGS. 20 through 22 are views showing the performance of the apparatus, wherein:

FIG. 20 is a model view showing the float depressed deeply and a large quantity of large scum masses flowing into the trough;

FIG. 21 is a model view of a state in which the float slightly rises up and attracts the drifting scum;

FIG. 22 is a model view of a state in which the float is again depressed and a large quantity of scum masses flow into the trough.

FIG. 23 is a plan view of a pond on which the apparatus is set;

FIG. 24 is a sectional view taken along the line I—I in FIG. 23;

FIGS. 25 and 26 are views of a third embodiment;

FIG. 25 is a view of the apparatus when the scum is dammed;

FIG. 26 is a view of the apparatus when the scum flows into the trough;

FIG. 28 is a plan view of a pond;

FIG. 29 is a sectional view taken along the line J—J in FIG. 28;

FIG. 30 is a perspective view of a lever-like arm;

FIGS. 31 through 34 are views of a sixth embodiment;

FIG. 31 is a plan of a pond;

FIG. 32 is a sectional view taken along the line K—K in FIG. 31;

FIG. 33 is a sectional view taken along the line L—L in FIG. 32;

FIG. 34 is a sectional view taken along the line M—M in FIG. 31;

FIG. 38 is a side view showing the outline of a scum treatment apparatus that has previously been proposed; and FIG. 39 is a view showing a state in which the cross-sectionally circular flights tend to cause stay of the scum.

DETAILED DESCRIPTION OF THE INVENTION

FIGS. 1 through 22 show the first embodiment of this invention.

Figure 1:
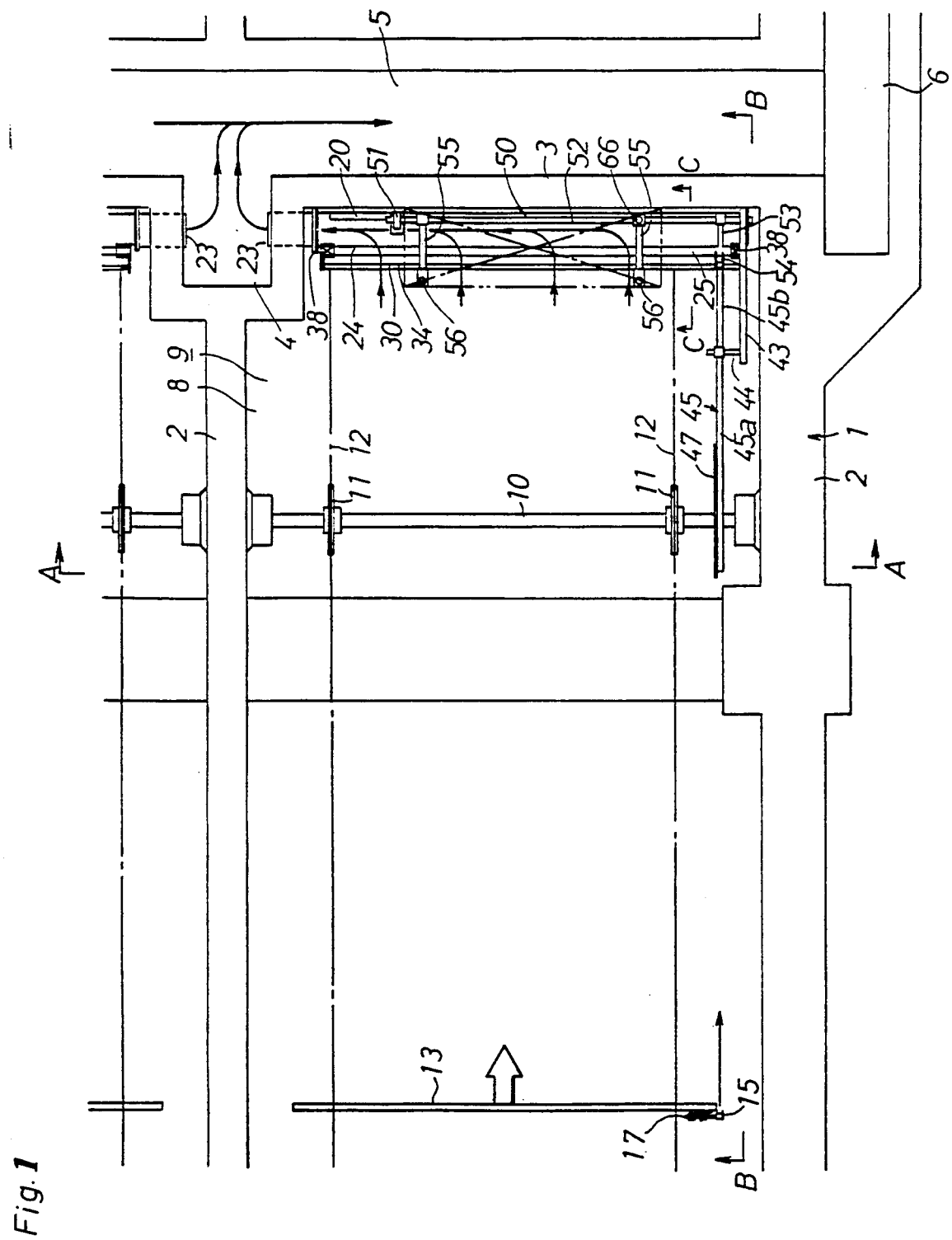
Figure 2:
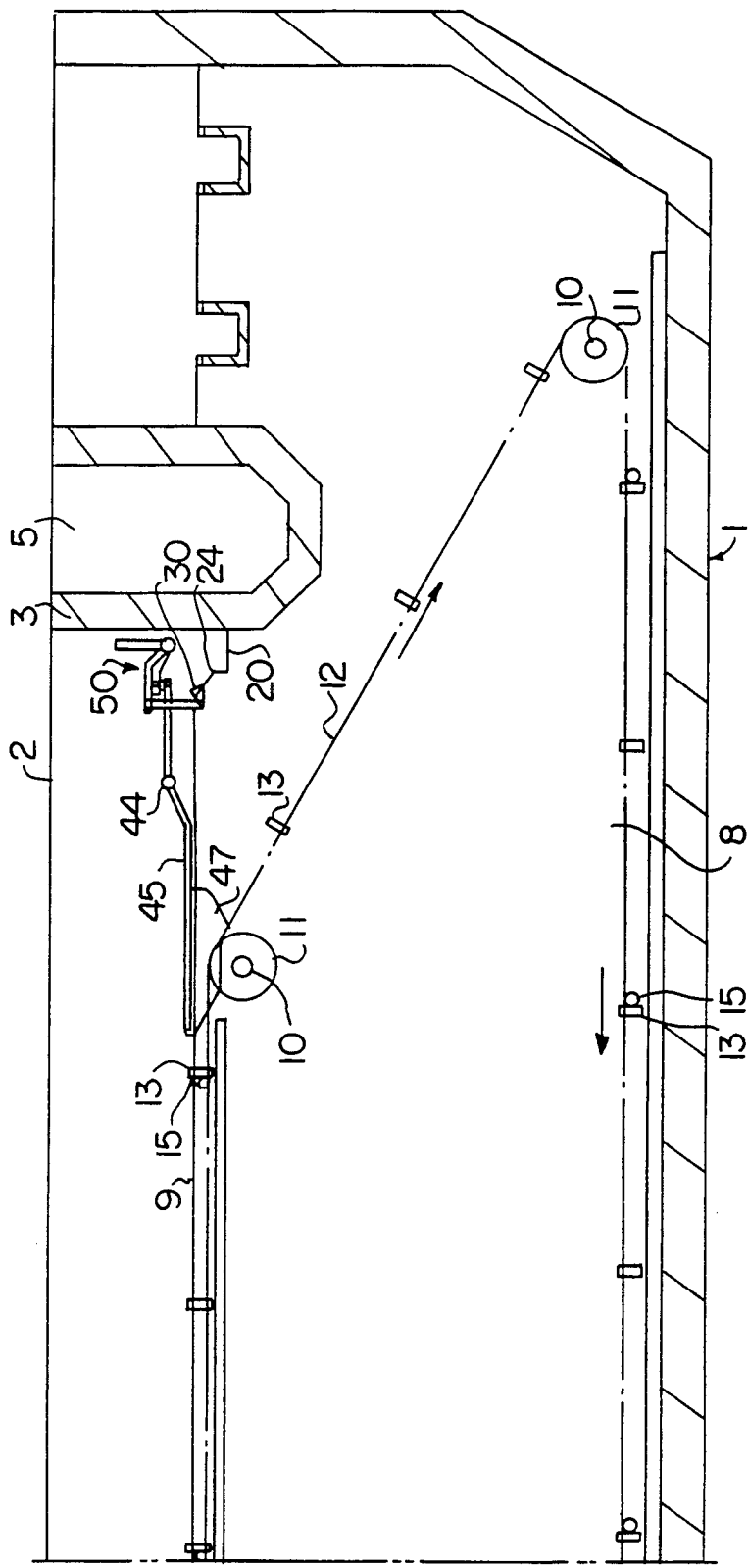
Figure 3:
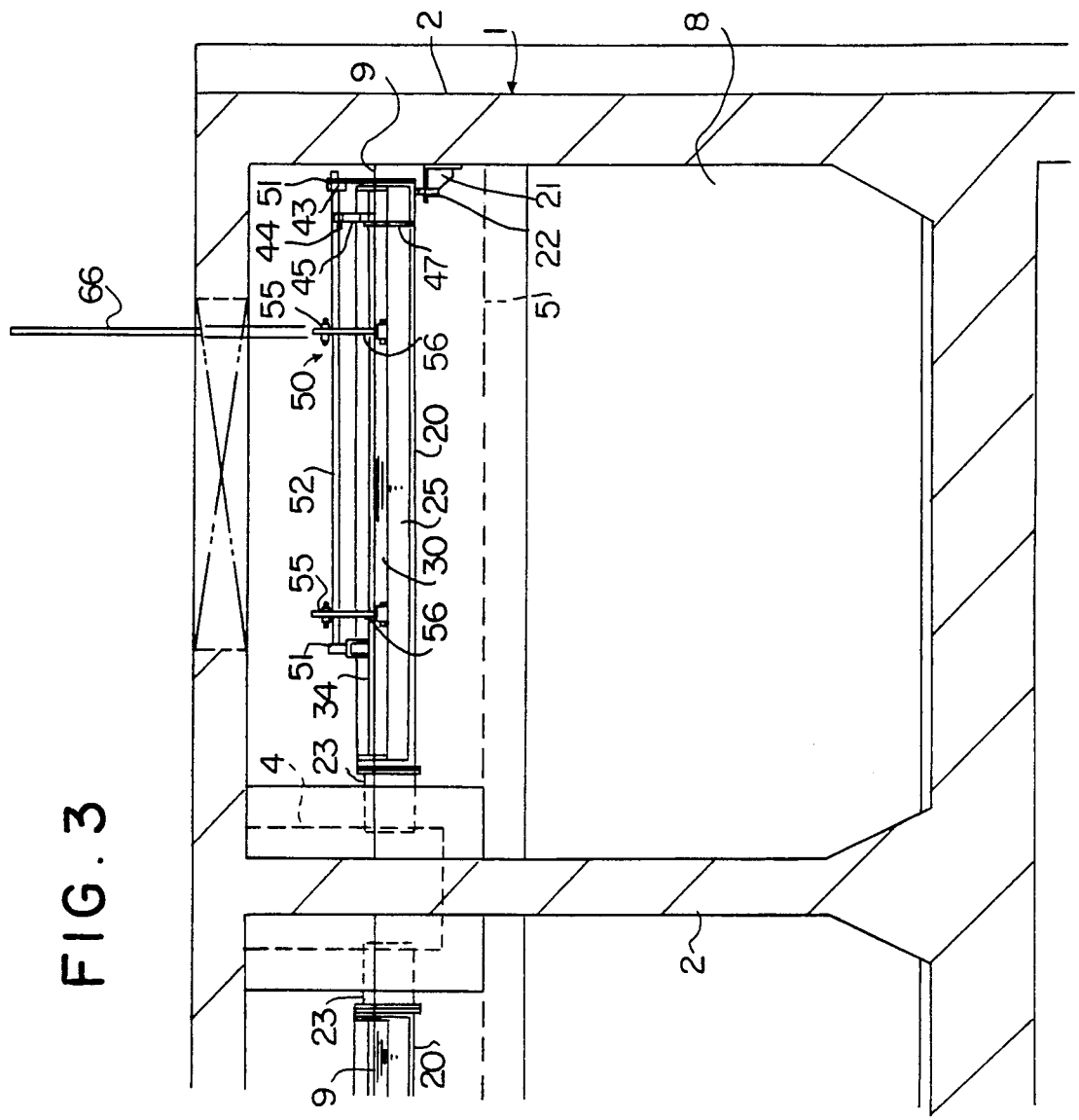

In this embodiment, a sedimentation pond 1 (treatment pond) is rectangular in planar shape, that is, long in one direction as shown in FIGS. 1 through 3, and is generally called a rectangular sedimentation pond. Side walls 2 . . . of the sedimentation pond 1 are long and one of two short sides is the front wall 3. A large number of sedimentation ponds 1 along the widthwise direction defined as extending between opposing side walls 2, 2 are lined side by side and, when these ponds along the widthwise direction are deemed as one line, a plurality of lines of ponds are arranged in the direction perpendicular to the widthwise direction.

Among sedimentation ponds 1 . . . , those adjacent to each other in the widthwise direction are provided with a common outflow part 4 (scum pit) in the form extending toward the ponds. The outflow part 4 communicates with an outflow groove 5 which extends in parallel with the widthwise direction and communicates with a subsequent discharge groove 6.

Water (sewage) 8 is poured into the sedimentation ponds 1 from the preceding treatment facilities. The upper surface of the water is a level 9 on which a large quantity of large and small scum masses 7 . . . (see FIG. 7) float and stay. In the sedimentation ponds 1, two rotative shafts 10 . . . are provided near the level 9 as well as on the bottom and the axis of each shaft 10 is disposed in the widthwise direction.

Two sprockets 11, 11 are fitted on the outer periphery of each shaft 10 and chains 12 are respectively applied to these sprockets 11 . . . . The two chains 12 are extended side by side in the widthwise direction and provided with flights 13 . . . adapted to outwardly protrude. These flights 13 . . . are disposed to extend in the widthwise direction at fixed spatial intervals along the running direction of the chain. The flights 13 . . . are continuously driven in the arrow direction as shown in the drawing. The driving motor is omitted from being illustrated. A roller (driving part) is provided for every two flights 13 . . . at the end on the right side along the advance direction of the flight. The roller 15 is rotatably mounted on the bracket 16 fixed to the back of the flight 13, through the support shaft 17. The roller 15 protrudes at one side more outward than the flight 13 in the widthwise direction, however, when set on the pond 1 that has already been constructed, is prevented from protruding too long. This is a reason for the necessity to provide guide means that will be described later. Guide rails 19 are provided in a position slightly lower than the level and on the bottom of the pond, along which shoes 20 provided on the flight 13 can move while being in contact therewith.

On the front wall 3 of the sedimentation pond 1, a trough 20 is unmovably set.

The trough 20 is substantially square in cross section and long in one direction, and one end thereof is completely closed and vertically adjustably fixed with bolts 22 to the bracket 21 fixed to the side wall 2.

The other end of the trough 20 is supported by an outflow pipe 23 provided to pass through the outflow part 4 and a hole opening at the end of the trough 20 communicates with the abovesaid pipe 23.

The front opening of the trough 20 is a flow inlet port 24 covering almost the entire length of the trough 20. A support plate (support means) 25 made of rubber is fixed to the wall on the front side lower than the flow inlet port 24 of the trough 20, the plate 25 being in the bending form, unmovably fixed to said front wall, and extending forward like a cantilever so as to be resiliently deformed in the vertical direction. This support plate 25 is made almost equal in length to the flow inlet port 24.

The support plate 25 suffices as far as resiliently deformable and may be made of, for example, a plastic material. As long as sealing function is ensured, a vertically movable part of the support plate may be fixed to the trough 20 with a hinge.

A plurality of holes are drilled on the front part of the support plate 25 and used for fixation of the float 30.

Figure 16:
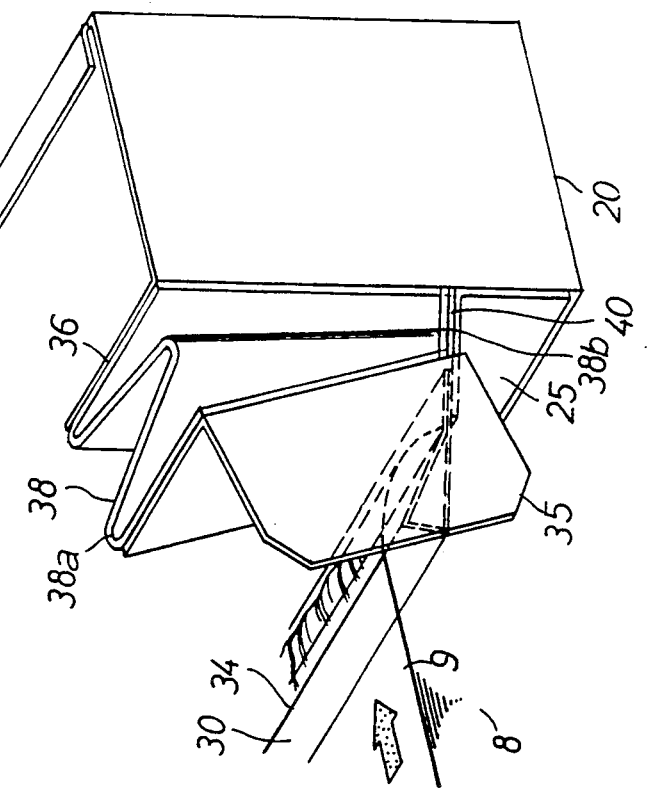
Figure 15:
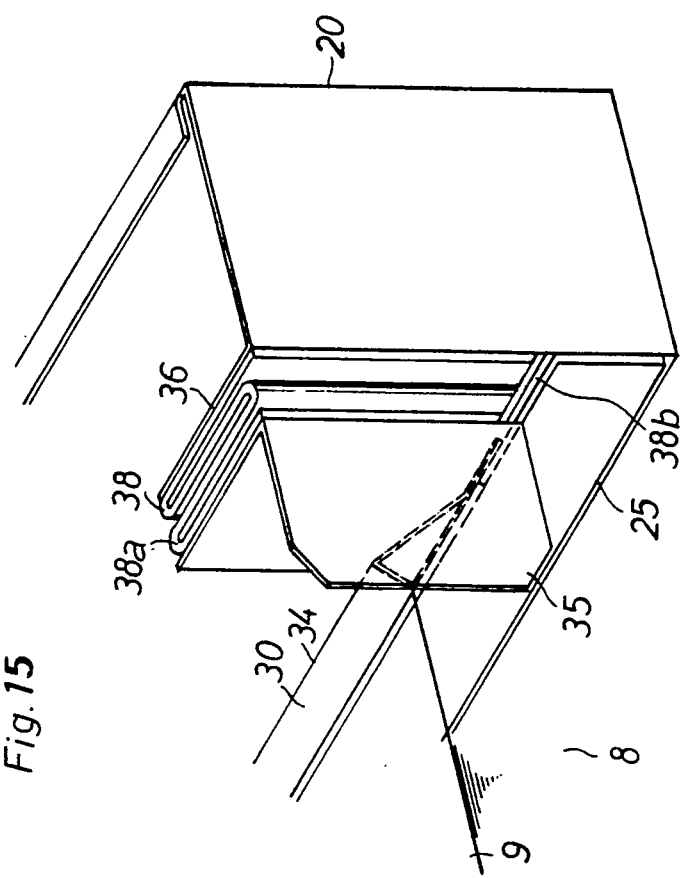

The float 30 is, as detailedly shown in FIGS. 7 through 13 and in FIGS. 15 through 17, provided with a base 31 in the doubled form and a main body part 32 which is hollow. The float 30 is made of a long material formed circular or square in cross section which is subjected to press work after insertion of a cross-sectionally triangular mold material into said circular or square material. Then, some part of the mold material is turned into a part of the main body part 32 and the other part into a base part 31. The base part 31 is, as enlargedly and detailedly shown in FIG. 11, provided with an integral and continuous end part formed through press work as described above not by welding. The float 30 is almost equal in length to the trough 20 similarly to the support plate 25. The upper end part of the float 30 serves as a dam 34 in the angle-like shape in cross section. A partition plate 35 in the shape of L when viewed from above is fixed to longitudinal both ends of the float 30 in such manner that one side of the plate may abut on the float 30 and may vertically move together therewith. The other flat part of the partition plate 35 is disposed to oppose the front faces of the stationary plate parts 36 provided on lengthwise both ends of the trough 20. A rubber side seal 38 integrally formed of a W-shaped flexible part 38a and a bottom part 38b is fixed to a part between the other plate part and the stationary plate part 36. This seal 38 prevents water 8 from flowing into the trough 20 sideways. A connecting sheet 40 is disposed between the bottom of the seal 38 and the support plate 25 and every corner is caulked, if required, for obtaining complete sealing. The float 30 is fixed to the support plate 25, as shown in FIG. 9, with a plurality of bolts 41 protruding from the bottom of the base part 31 and passed through the holes on the support plate 25 and with nuts (not shown) fastened from below.

A stay 43 horizontally protrudes forward from one end of the trough 20. One stay 43 is prepared for one pond and provided with a lever shaft 44 at the forward end thereof. The lever shaft 44 extends in parallel with the lengthwise direction of the trough 20 and rotatably supports the lever-like arm 45. This lever-like arm 45 is of one piece, provided with a part 45a extending to be opposite to the flight 13 and the other part 45b extending toward the trough 20, and fixed to the lever shaft 44 at the midway part between the two extending parts 45a and 45b thereof.

A cam 47 is fixed to the part 45a extending to be opposite to the flight 13 of the lever-like arm 45, separably from said arm 45. The cam 47 is provided with two downward projecting parts 47a, 47b and a recess part 47c positioned between these two projecting parts 47a, 47b, whereby, when the projecting parts 47a, 47b and the recess part 47c follow a roller 15 (driving part) and the roller corresponds thereto, the extending part 45a opposing the flight 13 of the lever-like arm 45 is rotated upward and, when the roller 15 corresponds to the recess part 47c, the extending part 45a of the lever-like arm 45 opposing the flight 13 is temporarily lowered.

Transmission means 50 is so constructed as to establish an interlocking relation between the part 45b of the lever-like arm 45 extending toward the trough 20 and the float 30.

Transmission means 50 of this embodiment, as shown in FIG. 7, is provided with an interlocking shaft 52 rotatably supported by the bearing 51 fixedly set on the rear upper part of the trough 20. A first interlocking arm 53 projects from this interlocking shaft 52 and is connected to the lever-like arm 45 to be in interlocking relation with each other by means of a rod 54.

The rods 54, 56 are in such structure as shown in FIG. 14. The rods 54, 56 are each provided with a screw shaft 59 having a cylindrical part 58 at the bottom end, a cylindrical body 60 fitted on the screw shaft 59, top and bottom nuts 61 for positioning said cylindrical body 60, and a top connecting shaft 62 fixed to the rod perpendicularly thereto. The top connecting shaft 62 is connected to the tip of a first interlocking arm 53 or of a second one 55 and a lower connecting shaft 63 passing through the cylindrical part 58 is connected to the tip of the lever-like arm 45 or to a U-shaped connecting piece 64 (see FIGS. 12 and 13) projecting from the front bottom of the float 30.

On the other periphery of the interlocking shaft 52, a manually operable lever 66 is fitted so as to be operated from above the pond.

Figure 19:
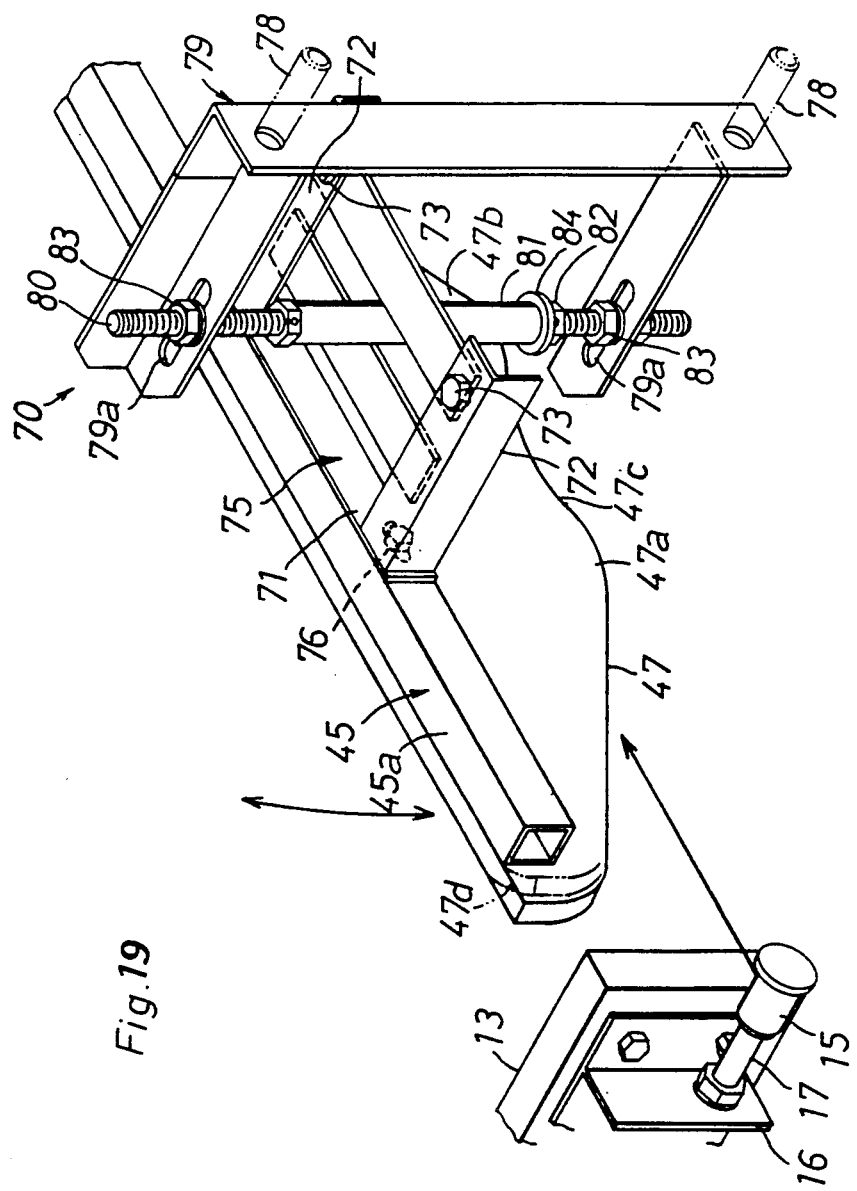

The cam 47 is detachably fixed to the lever-like arm 45 with bolts, and guide means 70 is provided, as shown in FIG. 19, between a part slightly behind the tip of the lever-like arm 45 and the side wall 2. Such arrangement intends to adapt the cam 47 to abut on the roller 15 without fail. In detail, on one side of the lever-like arm 45, provided is a side member 75 of the arm comprising a base plate 71, two channels 72, 72 projecting from the base plate 71, and two regulating plates 74, 74 positioned apart from each other and fixed by welding and with bolts between the two channels 72, 72. The arm-side member 75 is fixed to the arm with bolts 76 to be used for fixing the cam 47. Both regulating plates 74, 74 are positionally adjusted and fixed to be spaced at a certain interval. A wall-side member 79 as another member is fixed to the side wall 2 with bolts 78. The wall-side member 79 is provided withlong holes 79a at top and bottom and also with a screw shaft 80, cylindrical body 81, and nuts 82, 82. The screw shaft 80 is inserted into the top and bottom holes 79a after passed between the regulating plates 74, 74 and fixed to the wall-side member 79 with fixing nuts 83 . . . after adjusted to be properly positioned between the regulating plates 74, 74. To the lower end of the cylindrical body 81, a stopper 84 slightly larger than the cylindrical body 81 in diameter is fixed.

A distance between both regulating plates 74, 74 is almost equal to the outer diameter of the cylindrical body 81 and the regulating plates 74, 74 are guided to slide on the fixed outer periphery of the cylindrical body 81 with the up-and-down movement of the lever-like arm 45. Thus, the lever type arm 45 is moved up-and-down without swinging right and left. When the lever-like arm 45 overly lowers, the roller 15 rides thereon. For preventing such movement as above, the regulating plates 74, 74 abut on the stopper 84 when the lever-like arm 45 lowers below a certain level and prevent further lowering.

The tip 47d of the cam 47, if formed arcuate as shown by the imaginary line in such manner as pushing the cam 47 in the direction to keep the cam 47 away from the flight 13 when the roller 15 reaches the tip, pushes the roller 15 outward and prevents the flight 13 from striking the cam 47.

The action of this embodiment will be described.

As shown in FIGS. 7 and 8, when the roller 15 lies on this side of the cam 47, the cam 47 is in the lower position and the tip of the lever-like arm 45 is lowered. At this time, the 1st interlocking arm 53 is in a position raised through the rod 54 as well as the 2nd one 55 is also kept raised. Thus, the float 30 is kept raised through the rod 56 and stops water 8 as well as the scum masses 7 from flowing into the trough 20. As shown in FIG. 20, when the roller 15 draws close to the first projecting part 47a and is about to raise the cam 47, the 1st interlocking arm 53 is largely lowered through the rod 54 and the 2nd one 55 is also lowered. In this way, the float 30 is lowered to a great degree through the rod 56, whereby a large quantity of water 8 flows into the trough 20 and large scum masses 7 staying ahead of the float 30 are guided into the trough 20.

As shown in FIG. 21, when the roller 15 is about to reach the recess part 47c, the cam 47 starts lowering whereas the float 30 relatively rises. However, the dam part 34 of the float 30 stops at a position slightly below the level and, therefore, water 8 and scum 7 flow into the trough while turning into a rapid stream. The rapid stream causes scum masses 7 distant from the trough to be attracted toward the float 30 as shown by the arrow mark. In this way, the scum masses 7 are attracted toward the float 30 and flow into the trough 20.

When the roller 15 is about to reach the second projection part 47b, as shown in FIG. 22, the float 30 is again depressed. Then, even the large scum masses 7 having been collected in front of the float 30 start flowing into the trough 20. The small scum masses 7 are guided into the trough 20 with the flow of the large scum masses, and the scum masses distant from the float 30 are attracted to the trough. When the roller 15 has passed the 2nd projecting part 47b, a state of damming is restored as shown in FIGS. 6 and 7.

Repeat of such cycle as above enables effective removal of scum 7.

In some cases, the side seal 38 deteriorates when exposed to the sunshine. As shown in FIGS. 17 and 18, a plate 92 is disposed in front of the fixed plate part 36 and fixed with bolts 88 . . . in such manner as clamping one end (rear end) of the side seal 38, and the other plate 93 is disposed in the rear of the partition plate 35 and fixed with bolts 88 . . . for clamping the other end (front end) of the side seal 38. Deterioration of the side seal 38 can be prevented by fixing a horizontal covering 85 to cover the side seal 38 to the upper end of one of the two plates 92, 93. In this case, another ways to extend the plate 93 upward, to pass a bolt 86 through this extended part and aforesaid extended part of the plate 92 as well as the space therebetween, and to provide a compression spring 87 on the outer periphery of the bolt 86 lying above the trough 20 may satisfy the purpose. Such structure as above can effectively prevent, for example, the cam 47 from becoming incapable of downward return on account of increase in quantity of water 8 or the float 30 from suspending when water 8 is absent in the pond 1.

A scum treating apparatus for only one pond has typically been described above and another apparatus adjacent to the former is arranged so that the two are symmetrical with respect to the side wall 2 as a line as shown in FIGS. 1 and 3. However, in some cases, both apparatuses are not symmetrical but identical with each other in all respects.

Figure 23:
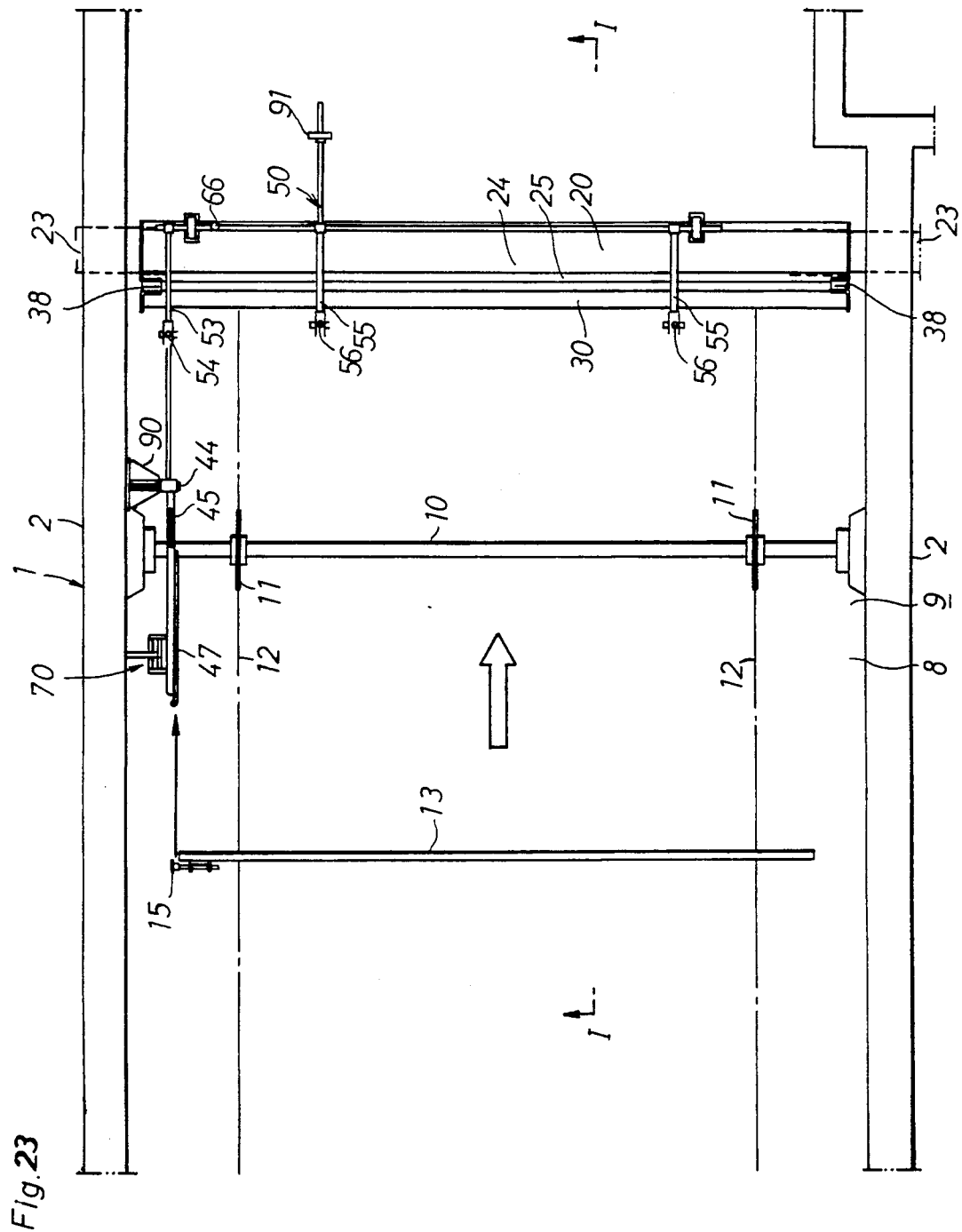
FIGS. 23 and 24 are views of a second embodiment.
Figure 24:
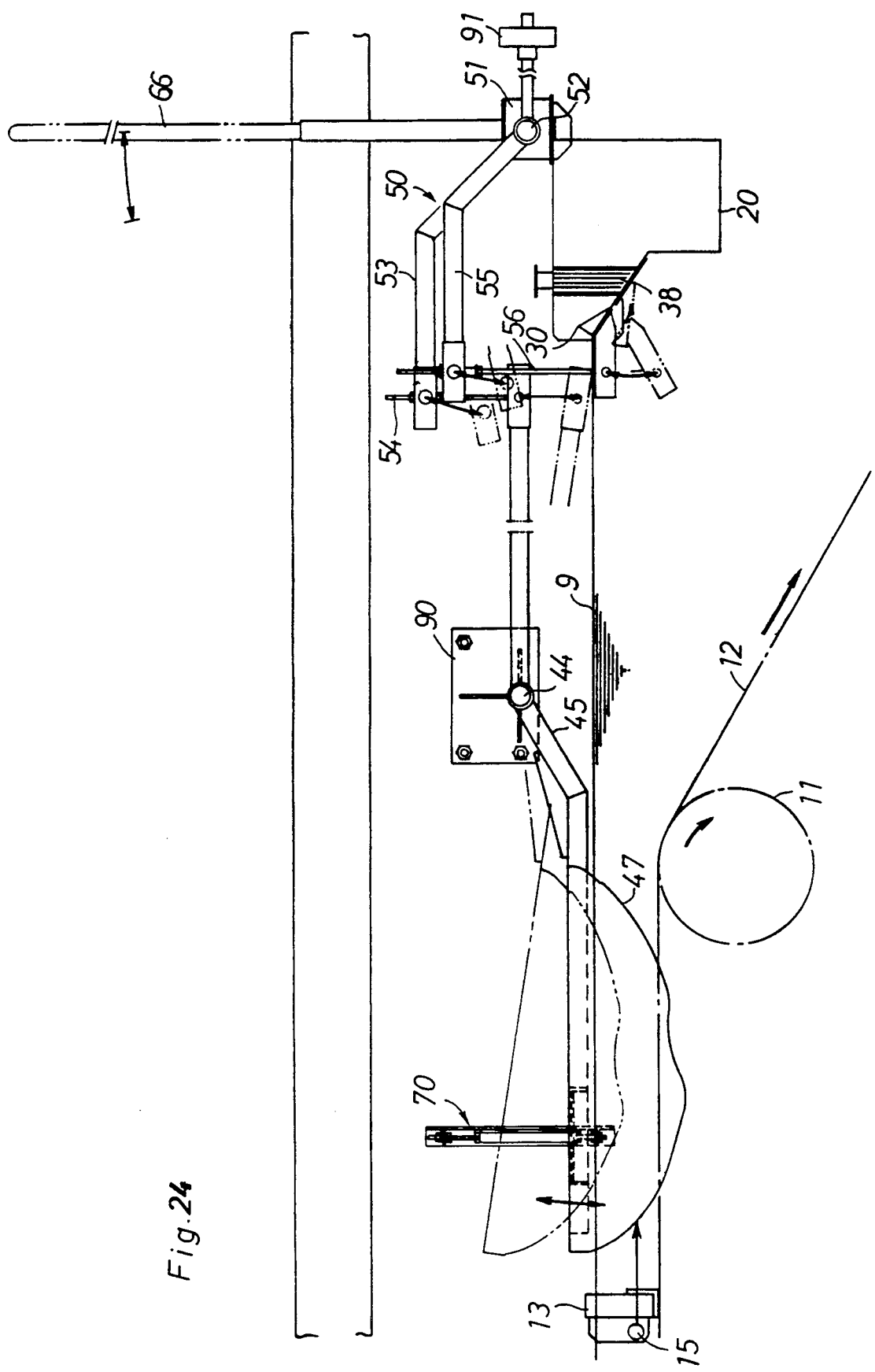

FIGS. 23 and 24 show a second embodiment. Since this embodiment is structurally similar to the 1st embodiment in many respects, the same reference numerals as those in the 1st embodiment will be used as far as possible for the same parts in the description of this embodiment.

In the 1st embodiment, the lever shaft 44 is supported by the stay 34 extending from the side of the trough 20 whereas, in this 2nd embodiment, by a bracket 90 fixed to the side wall 2. In other points, similarly to the 1st embodiment, the lever-like arm 45 is positioned above the level and is of the type using an interlocking shaft 52 and two interlocking arms 53, 55. In the 1st embodiment, the spring 87 is used for the purpose of returnig the cam 47 to the initial position and pushing the float 30 upward whereas, in this embodiment, a balancer 91 is fixed to the interlocking shaft 52 for attaining the same purpose.

Figure 25:
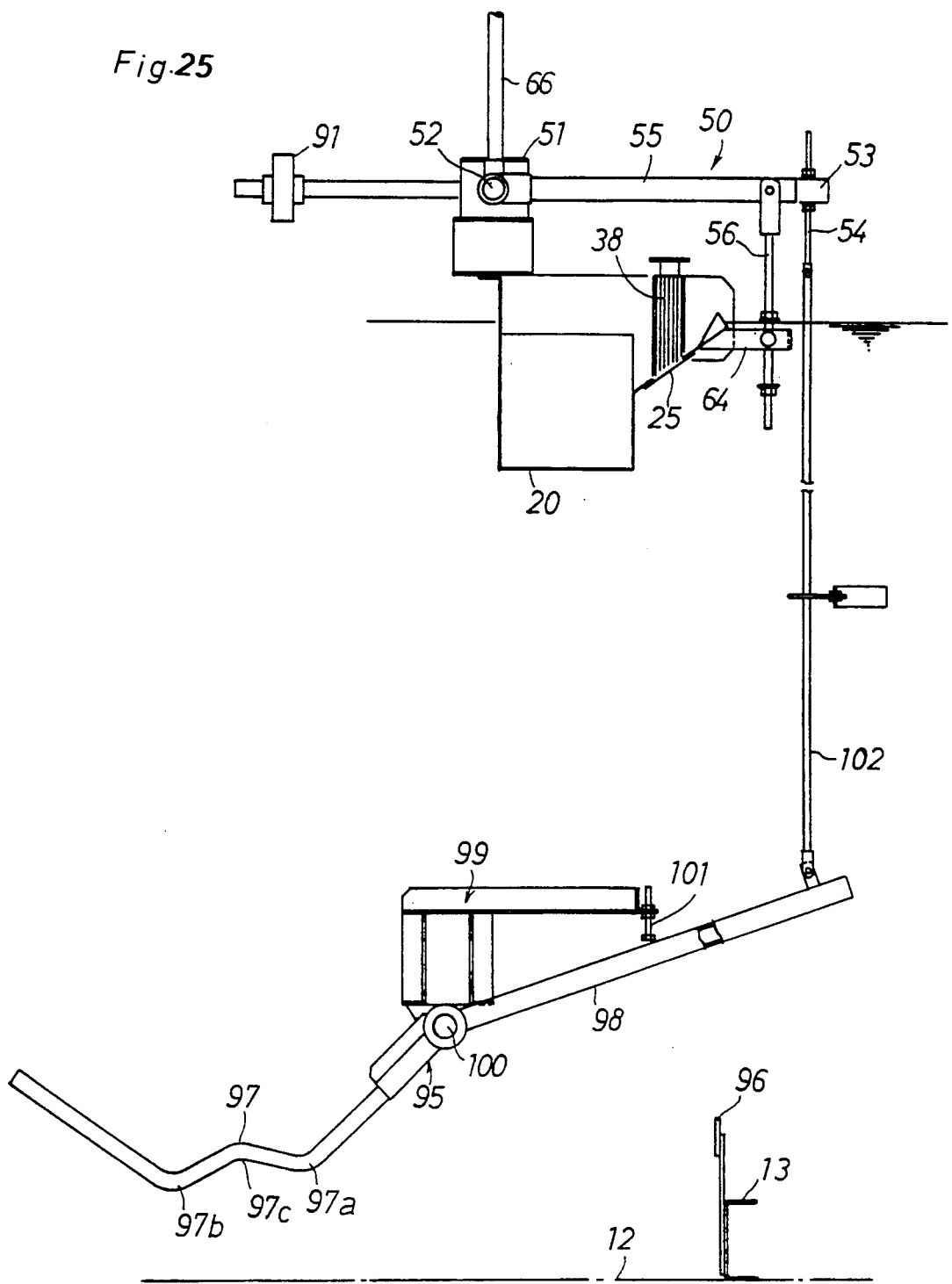

FIGS. 25 and 26 show a third embodiment.

This embodiment is, similarly to the 1st and 2nd ones, of a type employing an interlocking shaft 52 and two interlocking arms 53, 55, in which, however, the lever-like arm 95 is positioned not above the level but considerably deep below the level and near the bottom of the pond so as to be kicked up by a driving shoe 96 moving from below to above.

The lever-like arm 95 is provided with a W-shaped cam 97 and arm part 98. The lever-like arm 95 is rotatably supported by a lever shaft 100 supported by a bracket 99 fixed to the side wall 2. The bracket 99 is provided with a stopper 101 for regulating a limit to the rise of the lever-like arm 95 for determining a limit to the rise of the float 30 with respect to the level. The cam 97 is provided with two projecting parts 97a, 97b and recess part 97c. The lever-like arm 97 is in the form of a rod and provided with a cam plate separable from the rod similarly to that in the previous embodiment. A long rod 102 connects a rod 54 provided for the 1st interlocking arm 53 to the lever-like arm 97.

Figure 27:
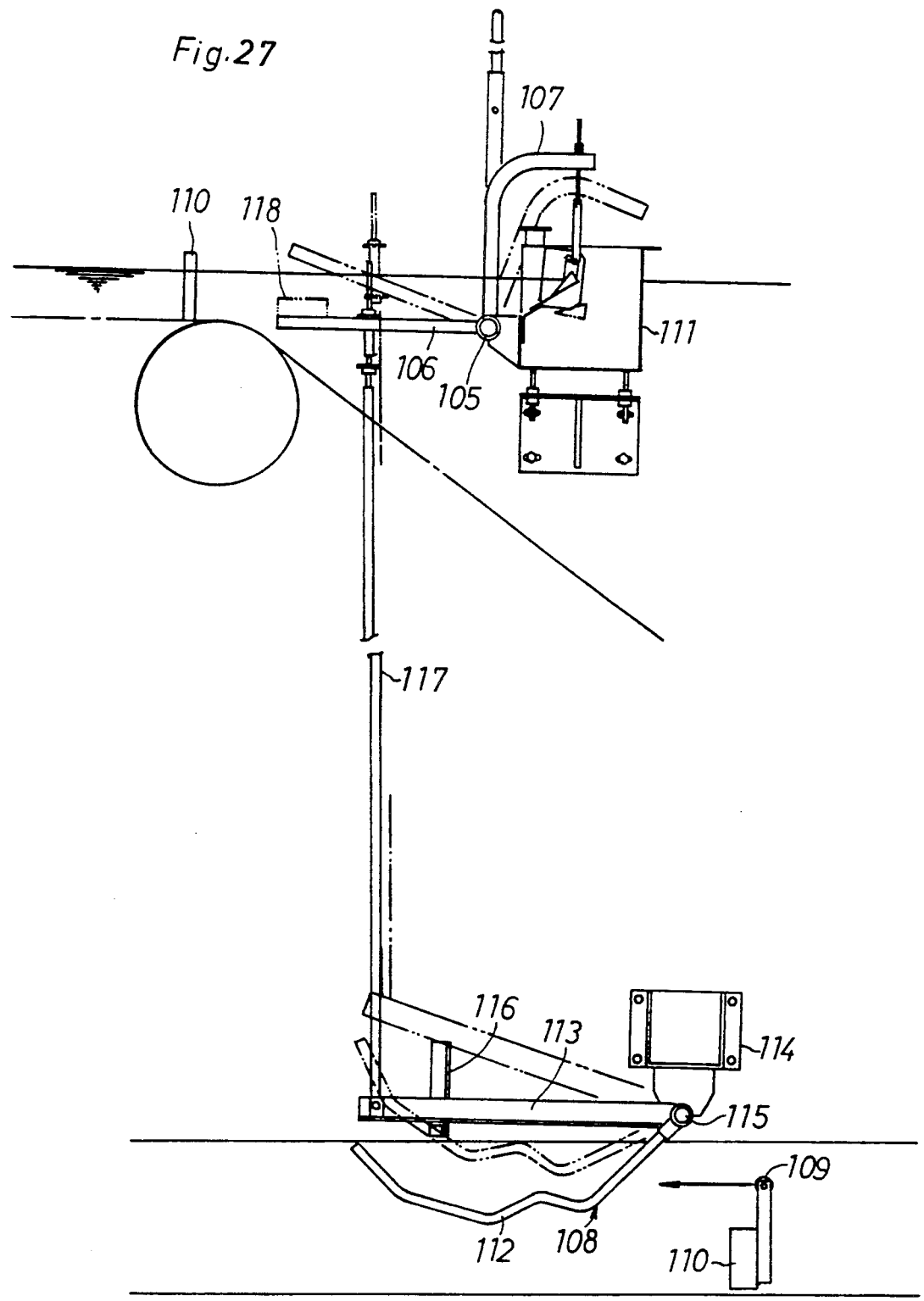
FIG. 27 is a vertical sectional view of a fourth embodiment.

FIG. 27 shows a fourth embodiment.

This embodiment is of a type using an interlocking shaft 105 and two interlocking arms 106, 107, in which a lever-like arm 108 is provided near the bottom of the pond and so constructed as to be kicked by a roller 109 turning from bottom to above. However, in connection with the float 110 of such type as positioned inside the trough 111, the 2nd interlocking arm 107 is in the bending shape like L and projects upward from the front side. A lever-like arm 108 is provided with a cam 112 in the shape of W and an arm part 113 made of the channel. This lever-like arm 108 is rotatably supported by the lever shaft 115 supported by the bracket 114 fixed to the side wall 2. The arm part 113 is limited at the distance of rise by a stopper 116 provided on the side wall 2, whereby a limit to the distance of rise of the float 110 with respect to the level is determined. The cam 112 is provided with two projecting parts 112a, 112b and a recess part 112c. The lever-like arm 112 is in the shape of a rod, however, provided with a separable cam plate similarly to that in the previous embodiments. The 1st interlocking arm 106 and lever-like arm 108 are connected to each other with a long rod 117, which rod is so constructed as to rise in a certain distance with respect to a hole on the 1st interlocking are 106 while leaving said interlocking arm as it is and, when rising more than a certain distance, raise the 1st interlocking arm 106. A balancer 118, if provided on the 1st interlocking arm, may serve for making the return of the float easy.

Figure 28:
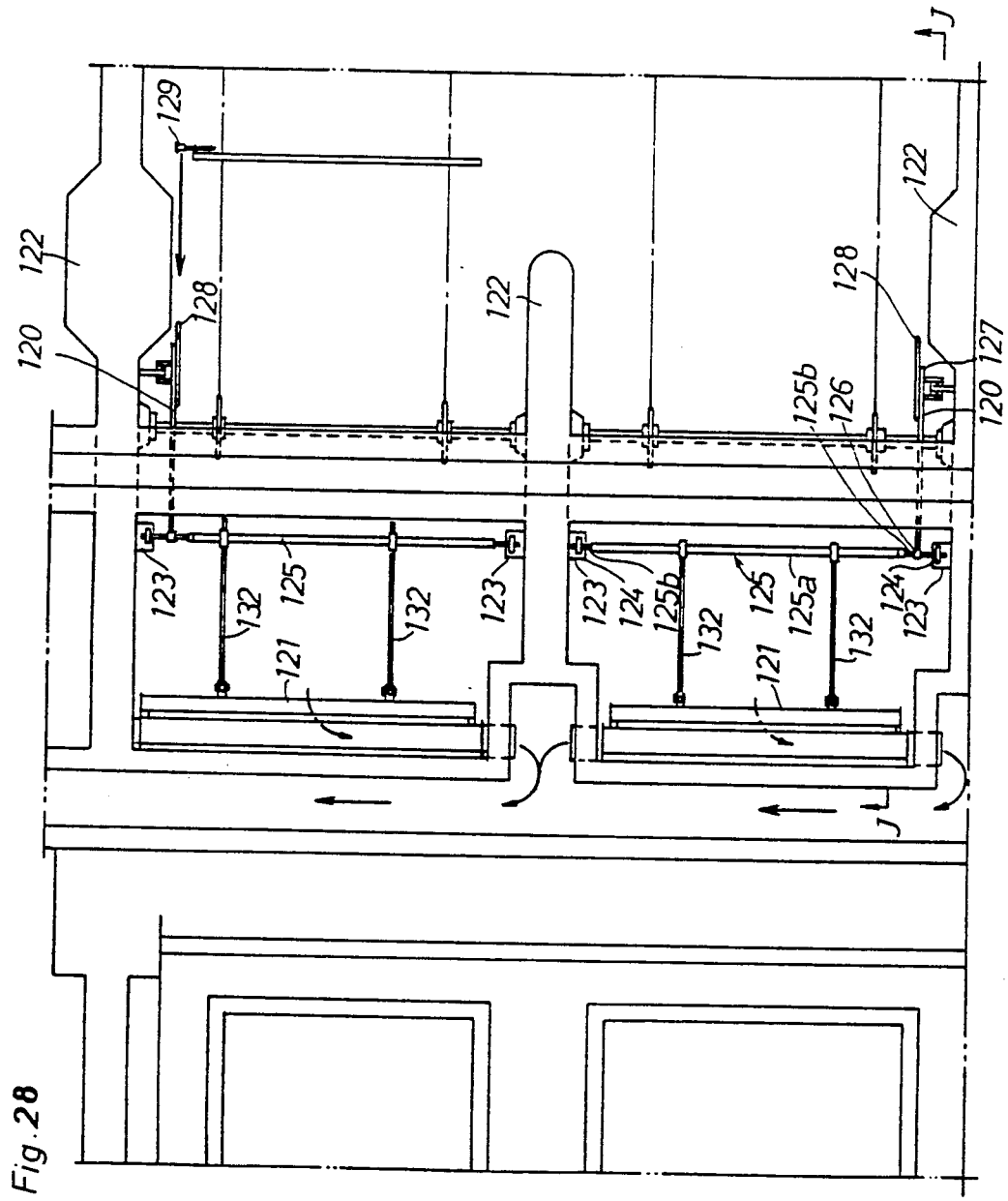
FIGS. 28 through 30 are views of a fifth embodiment.
Figure 29:
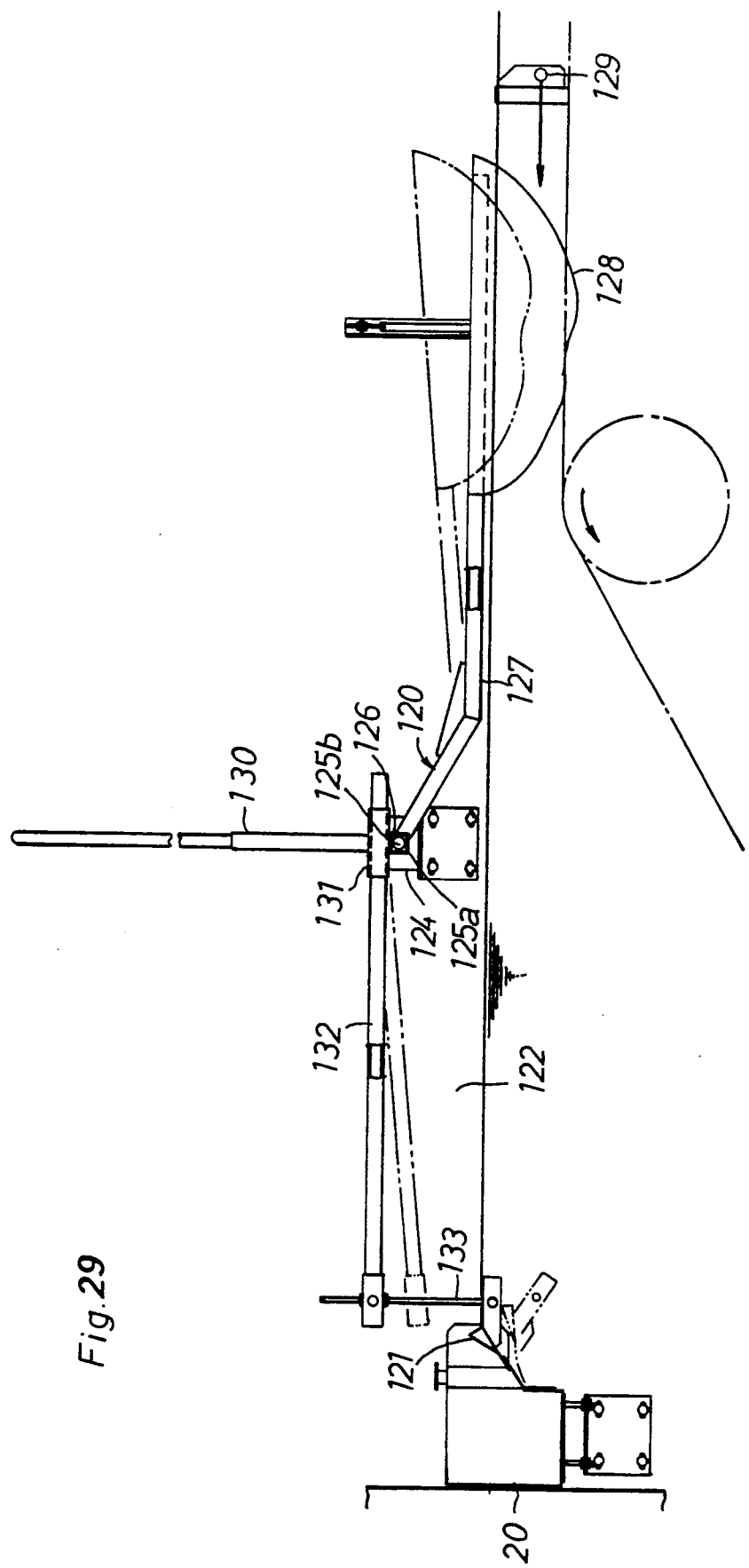
Figure 30:
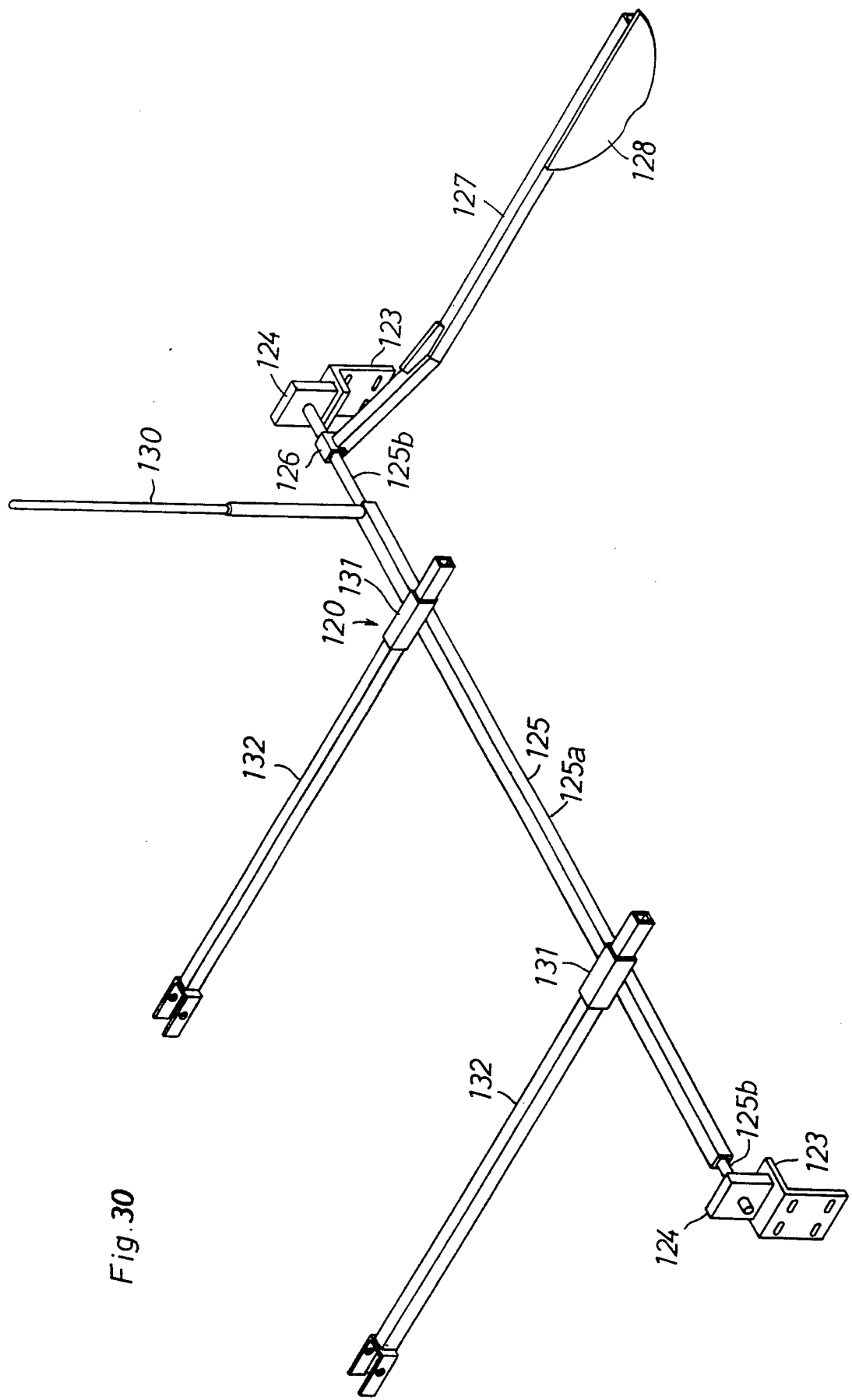
Figure 34:
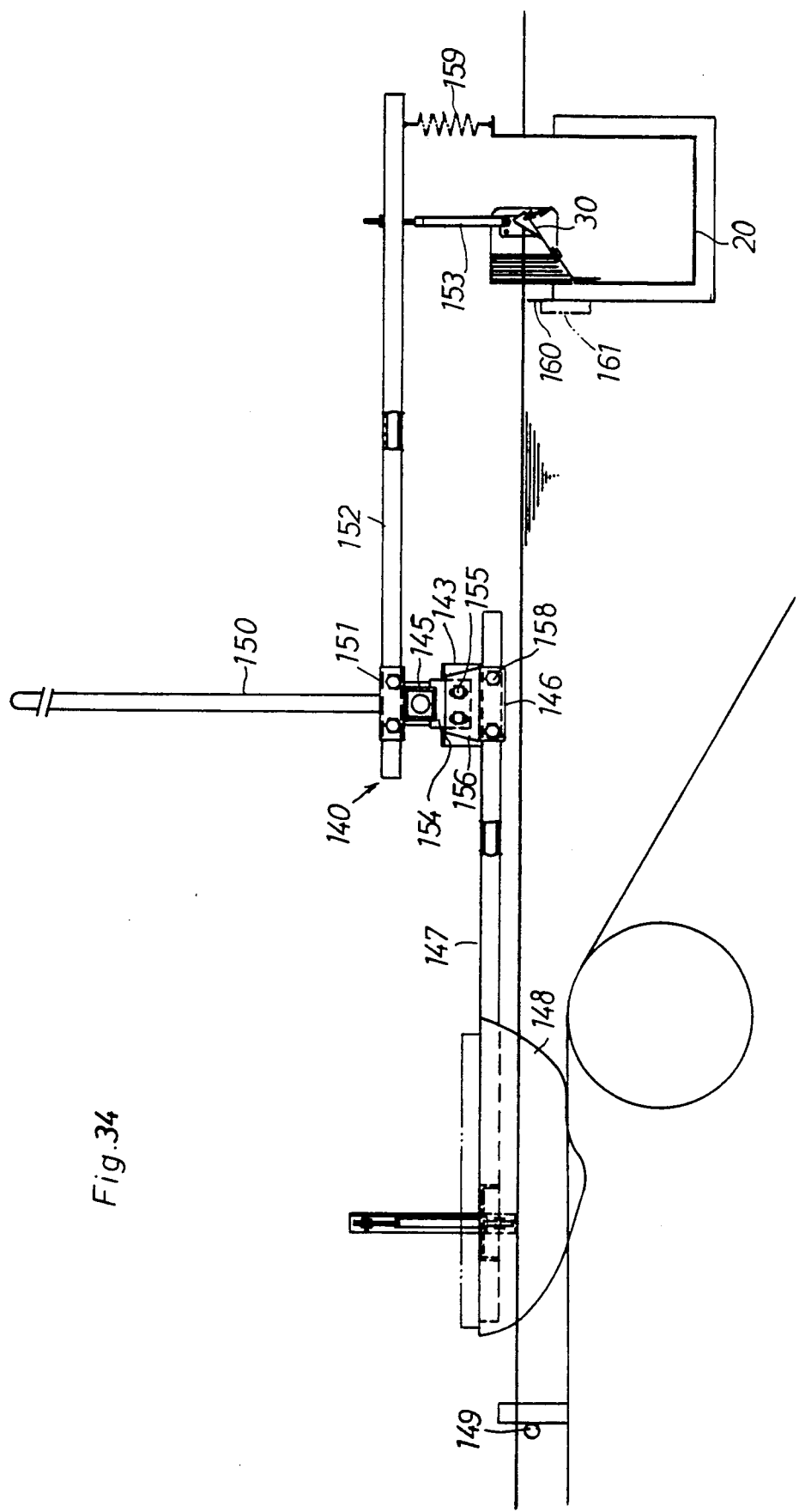

FIGS. 28 through 30 show a fifth embodiment.

A lever-like arm 120 in this embodiment is different in type from that in the previous ones. That is, the interlocking shaft and two interlocking arms are not used but a float 121 is directly operated instead.

L-shaped brackets 123 are fixed to both side walls 122 oppositely to each other. A bearing 124 is provided on each of brackets 123 which rotatably support a lever shaft 125. The lever shaft 125 comprises a body 125a square in crosssection and end parts 125b, 125b formed at both ends of said body and ready to be inserted. A square cylinder 126 is fitted on the end shaft 125b on one side and a cam shaft 127 extends from said cylinder. A cam 128 is provided on the tip of the cam shaft 127. When the cam 128 is kicked by the roller 129, the lever shaft 125 is rotated. Not only a manually operable arm 130 is provided on the lever shaft 125 but also square cylinders 131, 131 are at two spots on the midportion of the body 125a of the shaft. Arm parts 132, 132 are fixed to each square cylinder 131 so as to extend toward the trough 20, thereby two arm parts in total, right and left, being provided. Each arm part 132 is capable of moving to-and-fro with respect to the square cylinder 131 and of being adjusted in position relative to the float 30. The arm part 132 and the float 30 are connected to each other with a rod 133. The arm part 132 is connected to the square cylinder 131 by welding or with bolts.

In this embodiment, the cam shaft 127 is only one, not in pair on the right and left sides, and thus simple in structure and inexpensive. The arm part 132, even if one in number, may suffice. In this case, if brackets are provided at two spots on the float 30 and the tip of the arm part 132 is connected to the central part between the right and left brackets, the float 30 is ensured to be stable in action and simpler in structure than that shown in the drawing.

FIGS. 31 through 34 show a sixth embodiment.

A lever-like arm in this embodiment is almost the same in type as that in the 5th embodiment, however, partly different therefrom. The whole of this embodiment including other parts than the arm will be described. To both side walls 142, L-shaped brackets 143 are fixed oppositely to each other. A bearing 144 is provided on each bracket 143 and opposing brackets 144, 144 rotatably support a lever shaft 145. The lever shaft 145 comprises a body 145a square in crossection and end shafts 145b, 145b provided on both ends of the body 145a and ready to be inserted. A square cylinder 146 is fixed to the end of the body 145a on one side and a cam shaft 147 extends from said cylinder 146. A cam 148 is provided on the forward end of the cam shaft 147. When the cam 148 is kicked by the roller 149, the arm shaft 145 is rotated. On the lever shaft 145, not only a manually operable arm 150 is provided but also square cylinders 151, 151 are at two spots on the midportion of the body of the shaft 145a. Arm parts 152, 152 are fixed to each square cylinder 151 so as to extend toward the trough 20, thereby two arm parts in total, right and left, being provided. Each arm part 152 is capable of moving to-and-fro with respect to the square cylinder 151 and being adjusted in position relative to the float 30. The arm part 152 and the float 30 are connected to each other with a rod 153. The arm part 152 is connected to the square cylinder with bolts or by welding. Further, an upper bracket 154 projects from the bottom of the lever shaft 145 and a lower bracket 156 is fixed to said bracket 154 vertically adjustably. The lower end portion of the lower bracket 156 is formed into a square cylinder 157 to which the cam shaft 147 is connected movably back and forth while fastened with bolts. Not only the extension length of both the cam shaft 147 and the arm part 152 but also the height of the cam 148 is adjustable, thereby exact performance being ensured.

Incidentally, the float 30 is of a type to be positioned inside the trough 20, however, may be positioned outside.

A stretched spring 159 is extended between the lever-like arm 140 and the trough 20 so that the cam 148 may be prevented from overly lowering. A front dam 160 may additionally be provided on the front side of the trough 20 so as to rise and fall correspondingly to the level. The front dam 160 is adapted to follow the level by the other float 161, however, always slightly lower than the level 9.

Figure 36:
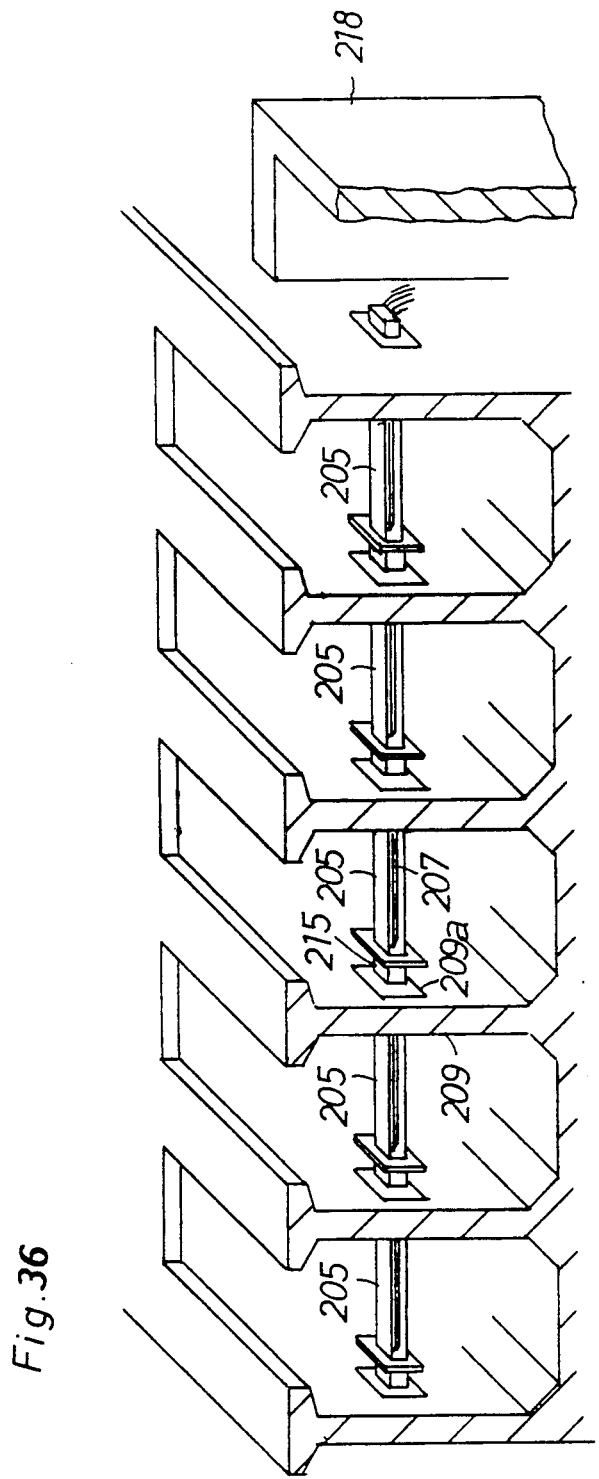
FIG. 36 is a schematic sectional perspective view of a system obtained from improvement in that shown in FIG. 35.
Figure 37:
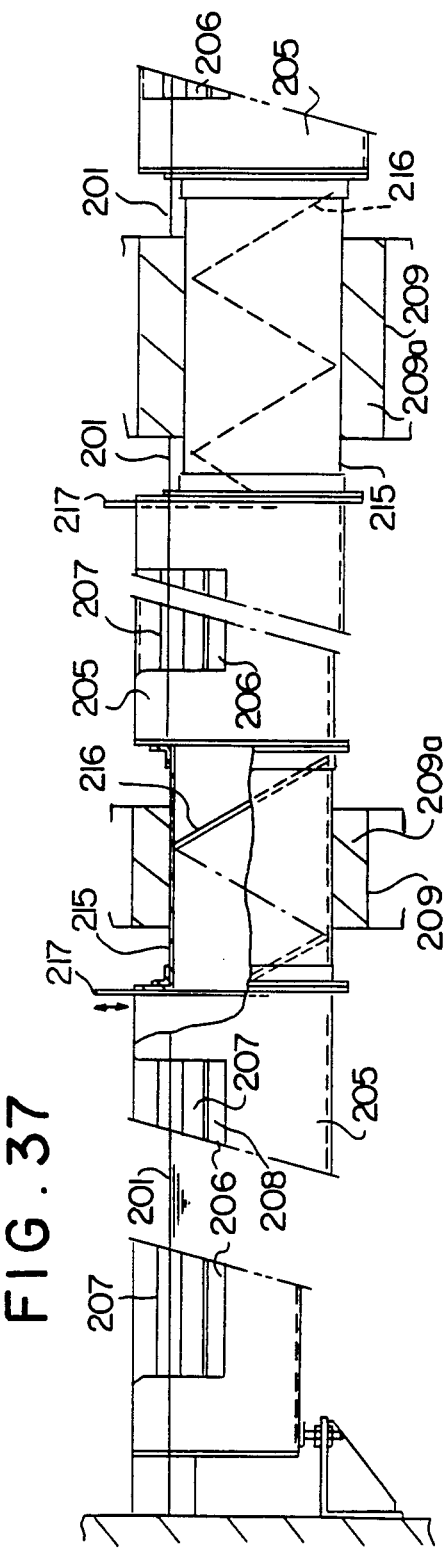
FIG. 37 is an enlarged sectional view of the main part shown in FIG. 36.

FIGS. 36 and 37 show an arrangement in which some idea is applied to the method of flowing out scum masses having flowed into the pond and elimination of a scum pit as the outflow part is intended for simplifying the structure of the pond.

Figure 35:
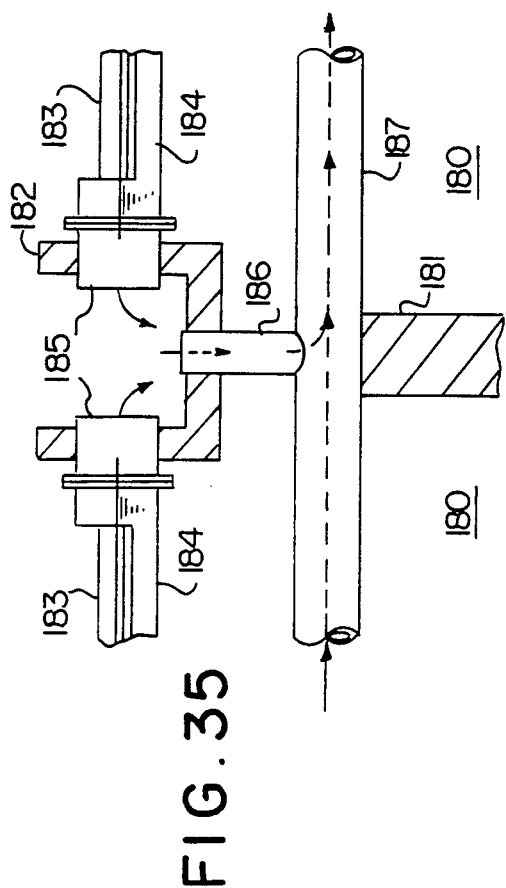
FIG. 35 is a sectional view of the existing scum outflow system.

FIG. 35 is a vetical sectional view showing a system of flowing out scum masses that has hitherto been employed. In this system, as also shown in FIGS. 1 through 3, a scum pit 182 is provided as a common outflow part on the side wall 181 between the ponds 180, 180 adjacent to each other, and an outlet of the outflow pipe 185 connected to the trough 184 having the float 183 faces this scum pit 182. The scum masses having flowed into the scum pit 182 are introduced into the connecting pipe 186 communicating with the bottom of the scum pit 182, as shown by the arrow mark, and further into the outflow pipe 187 connected to the connecting pipe 186 at right angles, so as to be discharged. Such structure as above is provided for every adjacent ponds 180, 180 and scum masses from each scum pit 182 are guided through one outflow pipe 187. This system requires not only scum pit 182 . . . but also connecting pipes 186 below the pits and outflow pipes 187 further below, thereby complicated construction work being necessary.

The system of this embodiment is composed as shown in FIGS. 36 and 37.

The trough 205 is fixedly set where the water surface 201 lies. The trough 205 is a square hollow body opening at top and bottom and the front opening thereof is an inlet port 206.

The trough 205 is formed slightly smaller in width than the space between side walls 209, 209 of the pond and a vertically movable float 207 is provided at the inlet port 206 of the trough so as to be raised or lowered by a support plate 208 made of rubber or the like. A system for moving the float 207 may be any one of those having been described up to now.

The adjacent troughs 205, 205 are connected to each other with a connecting pipe 215. This pipe 215 is square in cross section and fixed in such manner that the pipe is inserted into and supported at the center of a hole formed slightly larger than the pipe diameter by chipping each side wall 209 lacking the scum pit, and then is filled with concrete 209a. Scum crushing means 216 to be formed like a screw is provided on the inner periphery of the connecting pipe 215 while directed toward the axis of the pipe. This crushing means 216 is provided with sawtooth-like crushing parts 216a . . . .
The numeral 217 indicates a vertically adjustable throttle. The numeral 218 in FIG. 36 indicates a scum pit provided in one place near the end of the flow passage.

In this system, the troughs 205 are directly connected to each other with connecting pipes 215 . . . and such a connection as "scum pit 182-connecting pipe 186-outflow pipe 187" is needless. Accordingly, complicated construction work can be omitted.

The scum masses having flowed into the trough 205, together with water, are spirally moved and discharged after subjected to succesive crushing at the crushing parts 216 . . . . Fine crushing of scum masses makes the subsequent process exceedingly easy.

Crushing means may comprise sharp pins or thin plates each bent into a triangular shape.

I claim:

1. An apparatus installed in a disposal pond represented by a rectangular settling basin provided with a chain cyclically driven in such a cycle that said chain passes on a level immediately under a surface of the water and returns to said level immediately under said surface of the water through a bottom portion of said pond and flights projecting outward from a large number of places in a circumferential direction of the chain so as to move together with the chain for discharging scum floating on a surface of the water in said disposal pond out of the pond together with a little water, characterized in that interlocking means, damming-up means and scum-receiving means are provided, said interlocking means comprising a mechanism for converting a straight movement of said flights in the horizontal direction into an up and down movement to give an up and down movement to said damming-up means, the damming-up means being adapted to be interlocked up and down by means of the interlocking means in the pond with said surface of the water as a boundary; said scum-receiving means having a construction comprising a flowing-in port for receiving said scum and a subsequent long discharging passage and being fixedly installed so that said flowing-in port is positioned on a side of the damming-up means, and wherein the interlocking means further comprises a plurality of downward projecting portions and dented portions positioned between said projecting portions in portions thereof engaged with a driving portion of the flights, and the damming-up means being interlocked so as to be submerged slightly deeper under the surface of the water when said driving portion corresponds to the projecting portions while the damming-up means is interlocked so as to be submerged slightly shallower under the surface of the water when the driving portion corresponds to said dented portions.

2. An apparatus installed in a disposal pond represented by a rectangular settling basin provided with a chain cyclically driven in such the cycle that said chain passes on a level immediately under a surface of the water and returns to said level immediately under said surface of the water through a bottom portion of said pond and flights projecting outward from a large number of places in the circumferential direction of the chain so as to move together with the chain for discharging scum floating on a surface of the water in said disposal pond out of the pond together with a little water, characterized in that interlocking means, damming-up means and scum-receiving means are provided, said interlocking means comprising a lever-type arm having a cam means at a pointed end thereof, means for rotatably supporting said arm and transfer means for interlocking the lever-type arm with said damming-up means, the damming-up means being hollow so as to rise up to the surface of the water by its own buoyant force, a damming-up portion in an upper portion of the damming-up means having a chevron sectional shape and extending long in one direction, the damming-up means being installed in a front of a side of a flowing-in port of said scum-receiving means by supporting means so as to be movable up and down, a long direction of said settling basin being directed so as to be parallel to the scum-receiving means, at least said damming-up portion rising up and sinking with the surface of the water as a boundary to dam up a front flow of scum by a rising-up action and flow scum into the scum-receiving means by sinking action, the scum-receiving means having a construction comprising a flowing-in port for receiving the scum and a subsequent long discharging passage extending in one direction and being fixedly installed in the disposal pond so that said flowing-in port may be positioned on the side of the damming-up means and the passage may be directed in a direction meeting at right angles with a direction in which said flights move, and wherein said cam means further comprises two downward projecting portions and a dented portion positioned between said projecting portions provided in the form of a continuous curve and being detachably mounted on a pointed end of the lever-type arm as a plate material separate from the lever-type arm, and said projecting portions and said dented portion being continuously engaged with driving portions provided in the flights to interlock the damming-up means so as to be submerged slightly deep under the surface of the water when said driving portion corresponds to the projecting portion on the first stage while the damming-up means is interlocked so as to be submerged slightly shallower under the surface of the water when the driving portion corresponds to the dented portion and the damming-up means is interlocked so as to be submerged slightly deeper under the surface of the water when the driving portion corresponds to the projecting portion on the second stage.

* * * * *